(12) United States Patent
Dayana et al.

(10) Patent No.: US 12,375,799 B2
(45) Date of Patent: Jul. 29, 2025

(54) LOW POWER OBJECT DETECTION

(71) Applicant: QUALCOMM Incorporated, San Diego, CA (US)

(72) Inventors: Venkata Ravi Kiran Dayana, San Diego, CA (US); Micha Galor Gluskin, San Diego, CA (US); Wesley James Holland, Encinitas, CA (US); Jiafu Luo, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/337,303

(22) Filed: Jun. 2, 2021

(65) Prior Publication Data

US 2022/0394171 A1 Dec. 8, 2022

(51) Int. Cl.

| | |
|---|---|
| *H04N 23/65* | (2023.01) |
| *H04N 23/61* | (2023.01) |
| *H04N 23/67* | (2023.01) |
| *H04N 23/68* | (2023.01) |
| *H04N 23/75* | (2023.01) |
| *H04N 25/704* | (2023.01) |

(52) U.S. Cl.
CPC ........... *H04N 23/651* (2023.01); *H04N 23/61* (2023.01); *H04N 23/67* (2023.01); *H04N 23/672* (2023.01);
(Continued)

(58) Field of Classification Search
CPC ...... H04N 23/61; H04N 23/611; H04N 23/65; H04N 23/651; H04N 23/661;
(Continued)

(56) References Cited

U.S. PATENT DOCUMENTS

| | | | |
|---|---|---|---|
| 5,596,366 A | * | 1/1997 | Takashima ............. H04N 23/65 |
| | | | 348/E5.042 |
| 8,970,770 B2 | | 3/2015 | Nanu et al. |

(Continued)

FOREIGN PATENT DOCUMENTS

| | | | | |
|---|---|---|---|---|
| CN | 104811586 A | * | 7/2015 | |
| CN | 107301665 A | * | 10/2017 | ............. G06T 7/564 |
| CN | 110636223 A | * | 12/2019 | ......... H04N 5/23218 |

OTHER PUBLICATIONS

International Search Report and Written Opinion—PCT/US2022/030775—ISA/EPO—Sep. 15, 2022.

*Primary Examiner* — Paul M Berardesca
(74) *Attorney, Agent, or Firm* — QUALCOMM Incorporated

(57) ABSTRACT

Systems, methods, and computer-readable media are provided for low power, variable focus. An example method can include obtaining, based on a trigger, a first image of a scene captured by an image sensor, the first image being captured with a lens of the image sensor in a first configuration of a plurality of available lens configurations; determining, based on the first image and a first detection result, whether an object of interest is present in the first image; in response to determining that the object of interest is not present in the first image, adjusting the lens to a second configuration selected from the plurality of lens configurations; obtaining, by the image sensor, a second image of the scene while the lens is in the second configuration; and determining, based on the second image and a second detection result, that the object of interest is present in the second image.

50 Claims, 12 Drawing Sheets

(52) U.S. Cl.
CPC ........... *H04N 23/687* (2023.01); *H04N 23/75* (2023.01); *H04N 25/704* (2023.01)

(58) Field of Classification Search
CPC ..... H04N 23/68–689; H04N 7/18–185; G03B 5/02; G03B 2205/00–0084; G02B 27/64; G02B 27/646; G08B 13/196; G08B 13/19634–19636; G08B 13/19663–19676; G06F 1/32–3296
See application file for complete search history.

(56) References Cited

U.S. PATENT DOCUMENTS

| | | |
|---|---|---|
| 10,091,419 B2 | 10/2018 | John Archibald et al. |
| 10,192,279 B1 | 1/2019 | Erol et al. |
| 10,289,910 B1 * | 5/2019 | Chen ................. G06N 3/084 |
| 10,929,945 B2 | 2/2021 | Lim et al. |
| 2001/0033331 A1 * | 10/2001 | Eto ..................... H04N 23/687 |
| | | 348/208.99 |
| 2014/0347511 A1 * | 11/2014 | Rodriguez-Serrano ..................... |
| | | H04N 23/64 |
| | | 348/222.1 |
| 2016/0021295 A1 | 1/2016 | Krestyannikov et al. |
| 2017/0123186 A1 | 5/2017 | Shin et al. |
| 2019/0068868 A1 | 2/2019 | Lee |
| 2019/0087690 A1 | 3/2019 | Srivastava |
| 2020/0084379 A1 * | 3/2020 | Ikeda ................. A61B 1/00188 |
| 2020/0137308 A1 | 4/2020 | Kulik et al. |
| 2021/0105399 A1 * | 4/2021 | Ikeda ................. H04N 23/633 |
| 2021/0297602 A1 * | 9/2021 | Yuan ..................... H04N 7/06 |

* cited by examiner

1100

```
┌─────────────────────────────────────────────────────────────┐
│ OBTAIN, BASED ON A TRIGGER EVENT, A FIRST IMAGE OF A SCENE  │
│ CAPTURED BY AN IMAGE CAPTURING DEVICE WITH A LENS IN A      │
│ FIRST CONFIGURATION (E.G., A NON-ACTIVE STABILIZATION MODE) │
│ OF A PLURALITY OF AVAILABLE LENS CONFIGURATIONS             │
│ 1102                                                        │
└─────────────────────────────────────────────────────────────┘
                              │
                              ▼
┌─────────────────────────────────────────────────────────────┐
│ DETERMINE, BASED ON THE FIRST IMAGE OF THE SCENE AND A      │
│ FIRST DETECTION RESULT, WHETHER AN OBJECT OF INTEREST IS    │
│ PRESENT IN THE FIRST IMAGE                                  │
│ 1104                                                        │
└─────────────────────────────────────────────────────────────┘
                              │
                              ▼
┌─────────────────────────────────────────────────────────────┐
│ IN RESPONSE TO DETERMINING THAT THE OBJECT OF INTEREST IS   │
│ NOT PRESENT IN THE FIRST IMAGE, ADJUST THE LENS TO A        │
│ SECOND CONFIGURATION (E.G., ACTIVE STABILIZATION MODE)      │
│ SELECTED FROM THE PLURALITY OF AVAILABLE LENS               │
│ CONFIGURATIONS                                              │
│ 1106                                                        │
└─────────────────────────────────────────────────────────────┘
                              │
                              ▼
┌─────────────────────────────────────────────────────────────┐
│ OBTAIN A SECOND IMAGE OF THE SCENE WHILE THE LENS IS IN THE │
│ SECOND CONFIGURATION                                        │
│ 1108                                                        │
└─────────────────────────────────────────────────────────────┘
                              │
                              ▼
┌─────────────────────────────────────────────────────────────┐
│ DETERMINE, BASED ON THE SECOND IMAGE OF THE SCENE AND A     │
│ SECOND DETECTION RESULT, THAT THE OBJECT OF INTEREST IS     │
│ PRESENT IN THE SECOND IMAGE                                 │
│ 1110                                                        │
└─────────────────────────────────────────────────────────────┘
```

FIG. 11

LOW POWER OBJECT DETECTION

TECHNICAL FIELD

The present disclosure generally relates to low power variable focus and, more specifically, low power variable focus for object detection.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, a person, an object, etc. The image or video can be captured and processed by the computing device (e.g., a mobile device, an IP camera, etc.) and stored or output for consumption (e.g., displayed on the device and/or another device). In some cases, the image or video can be further processed for effects (e.g., compression, image enhancement, image restoration, scaling, framerate conversion, etc.) and/or certain applications such as computer vision, extended reality (e.g., augmented reality, virtual reality, and the like), image recognition (e.g., face recognition, object recognition, scene recognition, etc.), feature extraction, autonomous driving, and object detection, among others.

In some cases, an electronic device can process images to detect objects, faces, and/or any other items captured by the images. The object detection can be useful for various applications such as, for example, face authentication, gesture recognition, surveillance, automation, among others. In some examples, the electronic device can implement a lower-power or "always-on" (AON) camera that persistently or periodically operates to automatically detect certain objects in an environment. The lower-power camera can be implemented for a variety of use cases such as, for example, persistent gesture detection, persistent facial recognition for authentication, persistent face or other object (e.g., person, animal, vehicle, device, plane, etc.) detection, persistent quick response (QR) code scanning, etc. However, the persistent operation and/or more frequent operation of lower-power cameras and other camera setups can result in high overall power consumption. Moreover, mobile devices implementing such lower-power cameras can suffer from a reduced battery life, and stationary devices may demand more complex heat dissipation designs and/or exhibit an unacceptable low power efficiency during long term usage. Accordingly, a significantly higher power consumption can negatively impact use of the electronic device, the device's performance, and the user experience.

BRIEF SUMMARY

In some examples, systems and techniques are described for reducing the power consumed for object detection. According to at least one example, a method is provided for lower power variable focus for object detection. The method can include obtaining, based on a trigger event, a first image of a scene captured by an image capturing device, the first image being captured with a lens of the image capturing device that is in a first configuration of a plurality of available lens configurations; determining, based on the first image of the scene and a first detection result, whether an object of interest is present in the first image; in response to determining that the object of interest is not present in the first image, adjusting the lens to a second configuration selected from a plurality of available lens configurations; obtaining, by the image capturing device, a second image of the scene while the lens is in the second configuration; and determining, based on the second image of the scene, that the object of interest is present in the second image.

According to at least one example, a non-transitory computer-readable medium is provided for lower power variable focus for object detection. The non-transitory computer-readable medium can include instructions which, when executed by one or more processors, cause the one or more processors to: obtain, based on a trigger event, a first image of a scene captured by an image capturing device, the first image being captured with a lens of the image capturing device that is in a first configuration of a plurality of available lens configurations; determine, based on the first image of the scene and a first detection result, whether an object of interest is present in the first image; in response to determining that the object of interest is not present in the first image, adjust the lens to a second configuration selected from a plurality of available lens configurations; obtain, by the image capturing device, a second image of the scene while the lens is in the second configuration; and determine, based on the second image of the scene and a second detection result, that the object of interest is present in the second image.

According to at least one example, an apparatus is provided for lower power variable focus for object detection. The apparatus can include memory configured to store data and one or more processors coupled to the memory and configured to: obtain, based on a trigger event, a first image of a scene captured by an image capturing device, the first image being captured with a lens of the image capturing device that is in a first configuration of a plurality of available lens configurations; determine, based on the first image of the scene and a first detection result, whether an object of interest is present in the first image; in response to determining that the object of interest is not present in the first image, adjust the lens to a second configuration selected from a plurality of available lens configurations; obtain, by the image capturing device, a second image of the scene while the lens is in the second configuration; and determine, based on the second image of the scene and a second detection result, that the object of interest is present in the second image.

According to at least one example, another apparatus is provided for lower power variable focus for object detection. The apparatus can include means for obtaining, based on a trigger event, a first image of a scene captured by an image capturing device, the first image being captured with a lens of the image capturing device that is in a first configuration of a plurality of available lens configurations; determining, based on the first image of the scene and a first detection result, whether an object of interest is present in the first image; in response to determining that the object of interest is not present in the first image, adjusting the lens to a second configuration selected from the plurality of available lens configurations; obtaining, by the image capturing device, a second image of the scene while the lens is in the second configuration; and determining, based on the second image of the scene and a second detection result, that the object of interest is present in the second image.

In some aspects, the method, non-transitory computer-readable medium, and apparatuses described above can select the second lens configuration from the plurality of available lens configurations based on an amount of power required by the image capturing device to adjust the lens to the second lens configuration relative to one or more different amounts of power required by the image capturing device to adjust the lens to one or more other lens configurations from the plurality of available lens configurations.

In some examples, the first detection result and the second detection result are confidence values.

In some examples, the first configuration can include a first lens position, and the second configuration can include a second lens position that is different than the first lens position.

In some cases, adjusting the lens to the second configuration can include moving the lens from the first lens position to the second lens position using a focus motor.

In some examples, the plurality of available lens configurations can include a plurality of available lens positions, and the second lens position can be selected from the plurality of available lens positions based on an amount of power used by the focus motor to move the lens to the second lens position relative to one or more amounts of power used by the focus motor to move the lens to one or more other positions from the plurality of available lens positions.

In some examples, the plurality of available lens configurations can include a plurality of available lens positions, and the second lens position can be selected from the plurality of available lens positions based on a confidence value associated with the first detection result.

In some cases, selecting the second lens position can include reducing, based on the first confidence value, the number of the plurality of available lens positions excluding one or more positions as non-available lens positions for the selection of the second lens position from the plurality of available lens positions.

In some cases, selecting the second lens position can include comparing the amount of power to one or more amounts of power the focus motor requires to move the lens from the first position to one or more other positions from the plurality of available lens positions.

In some examples, the plurality of available lens configurations can include a plurality of available lens positions, and the second lens position is selected from the plurality of available lens positions based on a confidence value associated with a lens displacement from the first lens position to the second lens position.

In some examples, the plurality of available lens configurations comprises a plurality of available lens positions, and the second lens position is selected from the plurality of available lens positions based on priorities of focal distances associated with the plurality of available lens positions. In some examples, the priorities of the focal distances associated with the plurality of available lens positions are based on at least one of a detection confidence associated with a lens displacement from the first lens position to the second lens position, respective likelihoods of detecting the object of interest in images captured from each of the plurality of available lens positions, and an amount of power used by a focus motor to move the lens to each of the plurality of available lens positions. In some cases, the priorities of the focal distances associated with the plurality of available lens positions are based on a default type of the object of interest or a type of the object detected in the second image.

In some examples, the plurality of available lens configurations can include a plurality of available lens positions, and the second lens position can be selected from the plurality of available lens positions based on a relative distance between the first position and each of the plurality of available lens positions.

In some examples, the plurality of available lens configurations can include a plurality of available lens positions, and the second position is selected from the plurality of available lens positions based on one or more characteristics of the lens. In some cases, the one or more characteristics of the lens can include at least one of an aperture associated with the lens, a field-of-view associated with the lens, and a focus power profile associated with the lens.

In some aspects, the method, non-transitory computer-readable medium, and apparatuses described above can select the lens from a plurality of available lenses based on one or more characteristics of the lens and a focal distance associated with the object of interest. In some examples, the one or more characteristics can include at least one of an aperture, a field-of-view, and a focus power profile.

In some examples, the lens is selected from the plurality of available lenses based on a determination that a focus power profile associated with the lens includes a lower focus power than a respective focus power profile of one or more lenses from the plurality of available lenses.

In some cases, the object of interest can include at least one of a document, a quick response (QR) code, a face, a finger, a hand, a device, a product, and an animal. In some cases, the trigger event can include inertial motion above a threshold, an audio change above a threshold, a change in ambient light above a threshold, a change in a range to the object above a threshold, a trigger from an application, a depth measurement from an active depth sensing system, a trigger from a global navigation satellite system, a trigger from a global positioning system, a data connection, and a phase detection change above a threshold.

In some aspects, the method, non-transitory computer-readable medium, and apparatuses described above can adjust, in response to determining that the object of interest is present in the second image, a different image capturing device. In some examples, adjusting the different image capturing device can include turning on the different image capturing device and/or initializing the different image capturing device. In some cases, the different image capturing device can include a main camera device and/or a higher-power camera device than the image capturing device. In some aspects, the method, non-transitory computer-readable medium, and apparatuses described above can process, via the different image capturing device, one or more images of the scene. In some cases, the one or more images can include the second image and/or a third image captured by the different image capturing device.

In some aspects, the method, non-transitory computer-readable medium, and apparatuses described above can maintain the lens in the second configuration based on the second detection result.

In some cases, the first configuration can include a non-active optical image stabilization mode, and the second configuration can include an active optical image stabilization mode. In some examples, adjusting the lens to the second configuration can include activating the optical image stabilization mode using a lens stabilization motor.

In some cases, the first configuration can include a first aperture setting, and the second configuration can include a second aperture setting that is difference from the first aperture setting. In some cases, adjusting the lens to the second configuration can include changing the aperture of the lens from the first aperture setting to the second aperture setting using an aperture motor.

In some aspects, an apparatus can be, or can include, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, an Internet-of-Things (IoT) device, a smart wearable device, or another device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more accelerometers, gyroscopes, inertial measurement units (IMUs), motion detection sensors, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 11 is a flowchart illustrating an example process for low power, variable focus object detection, in accordance with some examples of the present disclosure.

DETAILED DESCRIPTION

Figure 1:
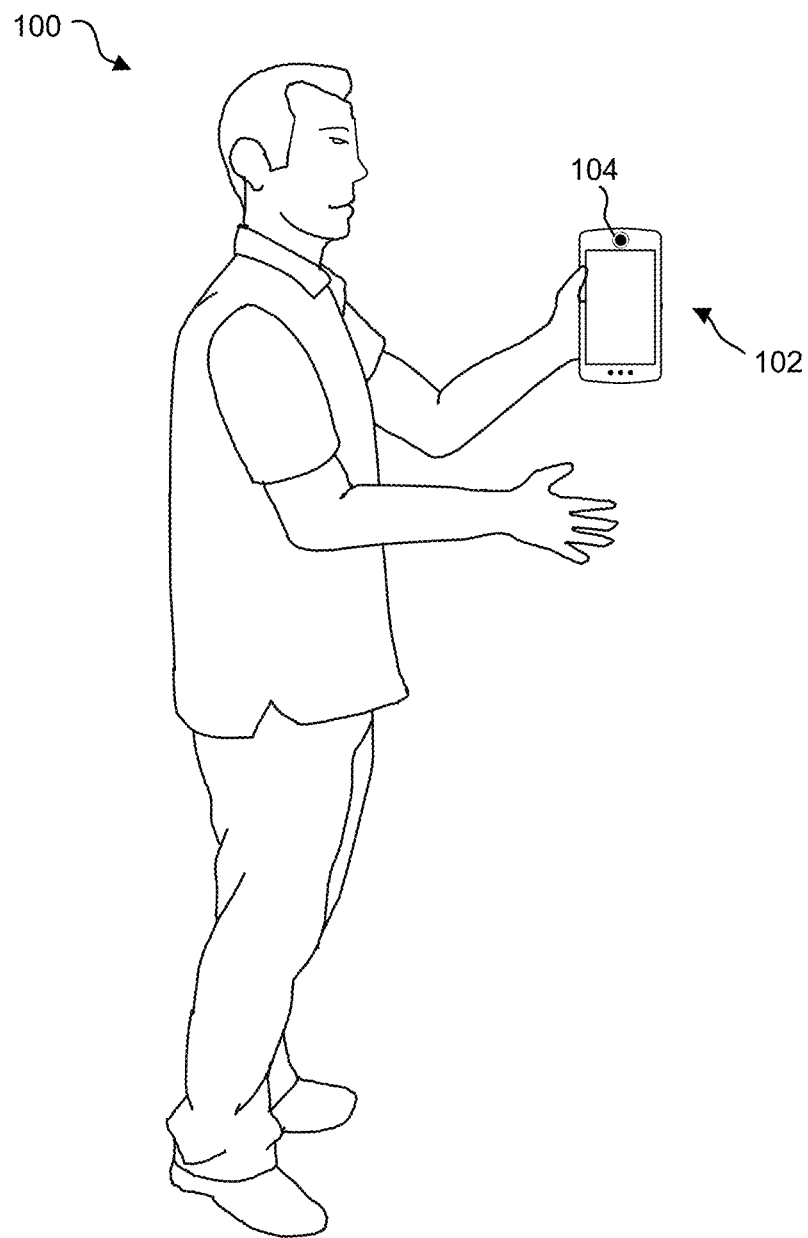
FIG. 1 is a diagram illustrating an example of a user using a mobile device configured to perform object detection, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A number of electronic devices (e.g., smartphones, laptop computers, tablets, wearable devices, cameras, etc.) are increasingly leveraging camera hardware for use cases where a camera can persistently or periodically operate when the electronic device implementing the camera is in a certain power state. For example, an electronic device can implement a camera that can capture images while the electronic device is in a lower power state, a locked state, and/or other states. In some examples, the camera can capture images while the electronic device has available battery power, the battery power level is above a threshold, the electronic device is awake, etc. In some cases, the camera can include a lower-power camera (often referred to as an "always-on" (AON) camera) or "power-sensitive" camera configured to detect objects/events periodically, instantaneously, on an ongoing basis, or on demand. In some cases, the lower-power camera can automatically detect certain objects as needed/desired while maintaining a lower power usage footprint. In some examples, a lower-power camera can implement lower-power hardware and energy efficient image processing software used to detect events/objects. The lower-power camera can remain on or "wake up" to watch movement in a scene and detect events/objects in the scene while using less battery power than other devices such as higher power/resolution cameras. Upon discovering an object, the camera can trigger one or more actions such as, for example, object detection, object recognition, facial authentication, image processing tasks, among other actions.

The camera implemented by the electronic device can detect objects for a variety of use cases such as, for example and without limitation, persistent gesture detection, persistent facial recognition for device authentication/unlocking, persistent face or object (e.g., person, animal, vehicle, device, etc.) detection, persistent quick response (QR) code scanning, etc. To illustrate, camera on a mobile device can detect a QR code when the QR code is within a field-of-view (FOV) of the camera and, upon detecting the QR code, "wake up" the mobile device without requiring the user to power on or unlock the mobile device.

While lower-power camera setups can leverage lower power camera hardware for reduced power consumption, the overall power consumption of the camera setups can nevertheless significantly reduce the battery life of mobile devices, which generally have a more limited battery life. For example, the camera setups can implement lens focus adjustment technologies to move, reposition, and/or otherwise change a focus of a lens module to bring a target into focus and/or increase the sharpness of the target in a captured image given a characteristic(s) of the target, a characteristic(s) of the environment, a characteristic(s) of the lens/camera configuration, a relative distance between the target and the camera, and/or any other factor. Non-limiting examples of lens focus adjustment components can include voice-coil motors (VCM), piezoelectric motors, stepper motors, ultrasonic motors, electroactive polymer motors, liquid lens electrowetting, electromagnetic focus motors, geared direct current (DC) motors, direct drive super sonic wave motors, and solid state lens controllers, among others.

The lens focus adjustment components can require and/or consume a significant amount of power to change a focus of the lens module. In many cases, the power consumption of lens focus adjustment components can increase when changing the focus of the lens module away from a neutral (or infinity) position. Such changes of a focus of the lens module can result in a large power draw by the camera setup, which can significantly impact the battery life of the mobile device. Moreover, since objects of interest often vary in distance from the camera and rear facing cameras typically include variable focus lenses, a lens focus adjustment component may have to frequently change the focus, aperture settings, image stabilization, etc., of the lens to bring objects of interest into focus. The changes in focus, aperture settings, image stabilization, etc., can draw a significant amount of power from moving/positioning the lens focus adjustment component away from a neutral or current position as objects at different distances are observed in the scene. Such a power draw can have a negative impact on the device and/or the performance of the device.

Systems, apparatuses, processes (or methods), and computer-readable media (referred to collectively as "systems and techniques") are described herein for reducing the power consumption of lens adjustment components (e.g., focus motors, lens stabilization motors, aperture motors, controllers, drivers, circuitry, etc.) implemented in camera setups. In some examples, the systems and techniques described herein can reduce the number of lens movements required to successfully detect objects of interest. In some cases, the systems and techniques described herein can reduce or minimize the amount of time spent by a lens (or lens module) focused away from a neutral or current position of the lens focus adjustment component. In some cases, the systems and techniques described herein can increase the amount of time a lens (or lens module) is maintained in a first configuration (e.g., non-powered or neutral configuration) in spite of ongoing object detection attempts, namely for detecting one or more objects of interest. The neutral (or infinity)configuration of the lens can be the least power consuming state of the lens, a non-powered position, a position associated with a lower power draw than a non-neutral or other position, etc. For example, in some cases, a neutral (or infinity) position of the configuration of the lens can be a least power consuming state with a spring loading the lens to remain in a neutral lens position, e.g., where the spring load is used to counter a lens movement during a focusing operation. The reduced power consumption of the lens focus adjustment components can be used to reduce the overall power consumption of object detection systems, image capturing devices with variable focus lenses, and/or any other image capturing systems capable of changing a focus of a lens module.

In some examples, the systems and techniques described herein can serially test or check a number of lens positions for detection of objects of interest. In some cases, the systems and techniques described herein can test or check lens positions intelligently and/or in a particular order to reduce or minimize lens changes performed before finding an appropriate lens position (and/or achieve a desired focus) to reduce or minimize the amount of power used for detecting an object of interest. For example, the systems and techniques described herein can test or check lens positions in an order determined based on the respective focus motor power requirements for the various lens positions. In some cases, the systems and techniques described herein can first test or check a lens position that requires the lowest amount of focus motor power before it can gradually check other lens positions as needed in an increasing order of focus motor power consumption.

In some examples, an image capturing system can initiate an object detection process based on one or more triggering events. A triggering event can include, for example, measured inertial motion above a threshold, an audio change above a threshold detected by an audio sensor, a change in ambient light above a threshold, a detected change above a threshold in a range to an object, a phase detection change above a threshold, a trigger (e.g., an instruction, request, parameter, etc.) from an application, a trigger (e.g., a threshold measurement, etc.) from an active depth sensing system, a trigger from a global navigation satellite system (GNSS) or global positioning system (GPS), a trigger from a data connection (e.g., a Bluetooth connection, a Wi-Fi connection, a wireless local area network connection, a wide area network connection, etc.), etc. Upon triggering an object detection process, the image capturing system can capture an image and determine whether an object of interest is present or not present in the captured image. In one non-limiting example, the image capturing system can calculate a confidence indicative of a certainty/likelihood that an object of interest is present or not present in the captured image based on the captured image. For example, the image capturing system can determine a confidence indicating a likelihood that a QR code is present in the captured image.

The image capturing system can calculate the confidence based on an image captured from a first lens position. If the confidence indicates an object of interest is present in the image, the image processing system can detect the object of interest from the first lens position. The image capturing system can maintain the lens in the first lens position, and no lens adjustment to a second lens position is necessary. Accordingly, the image processing system can detect the object of interest if the confidence is equal to or above a upper threshold. This does not require that the captured object of interest is in-focus in the image. With the confidence equal to or above the upper threshold, the image processing system can detect the object of interest without lens adjustment, rather by maintaining the lens in the first lens position. This contributes to the overall power consumption reduction. If the confidence is below the upper threshold and above a lower threshold, the image capturing system can capture another image from a second lens position, and can calculate a confidence based on the image captured from the second lens position. If the confidence indicates the object of interest is present in the image captured from the second lens position, the image processing system can detect the object of interest from the second lens position. If the confidence is below the upper threshold and above the lower threshold, the image capturing system can capture another image from a third lens position, and calculate another confidence based on the captured image. The image capturing system can serially check a number of detection confidences at different lens positions until the object is detected (while meeting the thresholds) or in case the confidence is blow an upper threshold and below a lower threshold a determination can be made that the object is not present.

The image capturing system can prioritize certain lens positions based on a number of factors such as, for example, the power consumption associated with different lens positions, the FOV and/or depth-of-field characteristic of a lens, a current or neutral position of a focus motor, object detection likelihoods associated with different lens positions, risk-reward assessments/comparisons calculated for different lens positions, etc. In some cases, the image capturing system can start the object detection checks from a neutral or a current position of the focus motor. For example, the image capturing system can start with a detection confidence from a neutral position of the focus motor which, in some cases, may not require/involve a power draw from the focus motor. If the confidence from the neural position is below a threshold, the focus motor can move the lens of the image capturing device to the next lowest power position (e.g., a different position which involves the next lowest amount of power draw from the focus motor to move the lens to that position). If the confidence from the next lowest power position is below a threshold, the focus motor can move the lens to a next lowest power position, and similarly check the confidence from that position. The image capturing system can continue with any additional checks until an object is detected or the process is completed. In this way, object detection triggers and focus motor power consumption can be used to detect objects from the lowest focus power position needed, instead of requiring a full autofocus process at a higher power.

In other examples, the image capturing system can use a laser range finder to determine the order of lens positions to check and/or assist with the calculation of detection confidences. Moreover, the image capturing system can leverage phase detection autofocus (PDAF) data to guide the lens positioning/repositioning and/or assist with the calculation of detection confidences. The image capturing system can additionally or alternatively leverage other data to guide the lens positioning/repositioning and/or assist with the calculation of detection confidences such as, for example, contrast-based autofocus (AF) searching (course or fine), depth information from stereo data, etc. In some cases, the image capturing system can adjust a lens aperture to increase a depth-of-field of the lens to potentially reduce the number of tested lens positions. In some cases, the image capturing system can implement one or more other sensors with different setups to reduce or limit the lens motor draw across the system.

FIG. 1 is a diagram illustrating an example of a user 100 using a mobile device 102 configured to perform object detection as described herein. In some examples, the mobile device 102 is a mobile phone (e.g., a smartphone with Internet and voice capabilities). In other examples, the mobile device 102 can include any other type of electronic device such as, for example and without limitation, a tablet computer, a laptop computer, a camera system, an Internet-of-Things (IoT) device, a smart wearable device (e.g., a head-mounted display, smart glasses, a smart watch, etc.), a smart television, or any other electronic device with an image sensor. In some implementations, the mobile device 102 can have a system architecture similar to the computing system 1200 described below with respect to FIG. 12.

In this example, the mobile device 102 includes a front-facing camera 104 that is configured to and can capture images of a physical scene or environment within a field-of-view (FOV) of the camera 104. In some cases, the front-facing camera 104 can include a low-power camera and/or a camera configured to persistently or periodically operate when the mobile device 102 is in a certain power state. In some examples, the front-facing camera 104 can capture images while the mobile device 102 is in a lower power state, a locked state, and/or other states. In some examples, the front-facing camera 104 can capture images while the mobile device 102 has available battery power, the battery power level is above a threshold, the mobile device 102 is awake, etc. In some cases, the front-facing camera 104 can include a lower-power camera (often referred to as an "always-on" (AON) camera) or "power-sensitive" camera configured to detect objects/events periodically, on an ongoing basis, or on demand. In some cases, the lower-power camera can automatically detect certain objects as needed/desired while maintaining a lower power usage footprint. In some examples, a lower-power camera can implement lower-power hardware and energy efficient image processing software. The lower-power camera can remain on or "wake up" to watch movement in a scene and detect events/objects in the scene while using less battery power than other devices such as higher power/resolution cameras.

In some examples, the front-facing camera 104 can include a low-power camera that passively captures images without requiring an explicit instruction (e.g., based on user input) requesting the capture of the images. In some cases, the front-facing camera 104 can have a lower frame-rate and can capture less images than the frame-rate of a higher power/resolution camera. In some examples, the images captured by the front-facing camera 104 (as a lower-power camera operating persistently or periodically when the mobile device 104 is in a lower-power or locked state) are not stored except for as needed to perform object detection as described herein. For instance, the images captured by the front-facing camera 104 (as a lower-power camera operating persistently or periodically when the mobile device 104 is in a lower-power or locked state) can be temporarily cached for use by one or more processors to perform object detection as described herein.

In some cases, the front-facing camera 104 can be activated to start capturing images when a trigger is detected. When a trigger is detected, the front-facing camera 104 can capture images of the user 100, and one or more processors of the mobile device 102 can perform an object detection process as described herein. In some cases, the trigger can include, for example and without limitation, inertial motion above a threshold, an audio change above a threshold, a change in ambient light above a threshold, a change in a phase detection based depth above a threshold, a change above a threshold in a range to one or more objects, a detected presence of one or more objects, a scene change, a change in a stereo based depth above a threshold, a combination thereof, or any other configured trigger.

In one illustrative example, a scene change can be detected when a change in pixel data above a scene change threshold is detected. The scene change can trigger the activation of the front-facing camera 104 to start capturing one or more images. The scene change threshold can be based on the amount of pixels in a first image that are different than corresponding pixels (at common locations) in a second image or multiple images. For instance, if at least 20% of the pixels in the first image are different than the corresponding pixels (at common locations) in the second image are different, a scene change can be detected. In another illustrative example, the front-facing camera 104 can be activated to start capturing images when motion is detected. In some examples, motion can be detected using an optical motion sensor of the mobile device 102, an accelerometer, a gyroscope, an inertial measurement unit (IMU), and/or other sensor or component of the mobile device 102.

The front-facing camera 104 may include one or more motors (not pictured) that move a lens of the front-facing camera 104 between lens positions corresponding to the different states (e.g., a front focus state, a back focus state, an in focus state) and one or more motor actuators (not pictured) that the mobile device 102 activates to actuate the motors. Non-limiting examples of lens motors can include voice-coil motors (VCM), piezoelectric motors, stepper motors, ultrasonic motors, electroactive polymer motors, electromagnetic focus motors, geared direct current (DC) motors, and direct drive super sonic wave motors, among others. The front-facing camera 104 may in some cases also include various additional non-illustrated components, such as lenses, mirrors, partially reflective (PR) mirrors, prisms, photodiodes, image sensors, processors, and/or other components that can be implemented in cameras or other optical equipment.

Figure 2A:
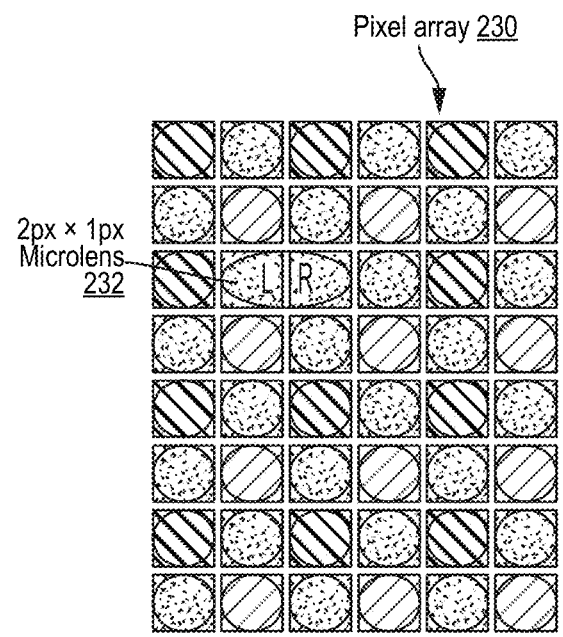
FIG. 2A is a diagram illustrating a top-down view of a pixel array configuration of an image sensor with two side-by-side focus pixels covered by a 2 pixel by 1 pixel microlens, in accordance with some examples of the present disclosure.
Figure 2B:
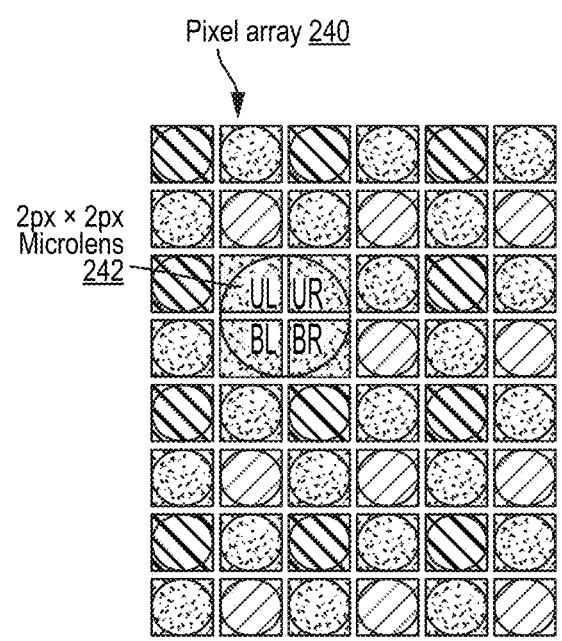
FIG. 2B is a diagram illustrating a top-down view of a pixel array configuration of an image sensor with four neighboring focus pixels covered by a 2 pixel by 2 pixel microlens, in accordance with some examples of the present disclosure.

FIG. 2A and FIG. 2B illustrate top-down views of example pixel array configurations of an image sensor. An image sensor of a camera system (e.g., front-facing camera 104) may include an array of pixels, such as the pixel array 230 of FIG. 2A or pixel array 240 of FIG. 2B. The pixel array (e.g., pixel array 230, pixel array 240) can include an array of photodiodes and microlenses. The 2 pixel by 1 pixel microlens 232 of FIG. 2A and the 2 pixel by 2 pixel microlens 242 of FIG. 2B both span multiple adjacent focus pixels (e.g., the microlenses cover multiple adjacent focus pixel photodiodes), and both can limit the amount and/or direction of light that strikes the focus pixel photodiodes of those focus pixels.

Once the pixel array (e.g., pixel array 230, pixel array 240) captures a frame, thus capturing focus pixel data for each focus pixel, focus pixel data from paired focus pixels may be compared with one another. For example, focus pixel data from a left focus pixel photodiode may be compared with focus pixel data from a right focus pixel photodiode, and focus pixel data from a top focus pixel photodiode may be compared with focus pixel data from a bottom focus pixel photodiode. If the compared focus pixel data values differ, this difference is referred to as the phase disparity, also known as the phase difference, defocus value, or separation error. Focus pixels under a 2-pixel by 2-pixel microlens 242 as in FIG. 2B essentially have two vertically-adjacent horizontally-oriented pairs of focus pixels and/or two horizontally-adjacent vertically-oriented pairs of focus pixels. Thus, the focus pixel data from the UL focus pixel may be compared to focus pixel data from the BL focus pixel (as a top/bottom pair), focus pixel data from the UR focus pixel may be compared to focus pixel data from the BR focus pixel (as a top/bottom pair), focus pixel data from the UL focus pixel may be compared to focus pixel data from the UR focus pixel (as a left/right pair), focus pixel data from the BL focus pixel may be compared to focus pixel data from the BR focus pixel (as a left/right pair), or some combination thereof.

Figure 3A:
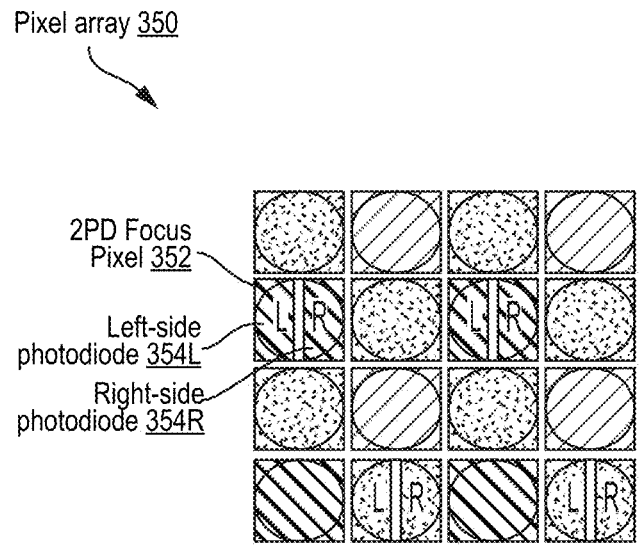
FIG. 3A is a diagram illustrating a top-down view of a pixel array configuration of an image sensor in which at least one focus pixel has two photodiodes, in accordance with some examples of the present disclosure.

FIG. 3A illustrates a top-down view of a pixel array configuration of an image sensor in which at least one focus pixel has two photodiodes. In particular, a four-pixel by four-pixel pixel array 350 with four focus pixels is illustrated in FIG. 3A. The four focus pixels illustrated in the pixel array 350 each include two photodiodes, with the left-side photodiode and the right-side photodiode of each focus pixel's photodiode pair labeled "L" and "R," respectively. Focus pixels with two photodiodes are sometimes referred to as dual photodiode (2PD) focus pixels.

One of the 2PD focus pixels of FIG. 3A is labeled as 2PD focus pixel 352. The left-side photodiode (L) of the 2PD focus pixel 352 is labeled "left-side photodiode 354L," and the right-side photodiode (R) of the 2PD focus pixel 352 is labeled "right-side photodiode 354R." For each captured frame, the left photodiode 354L and the right photodiode 354R may capture light received by the 2PD focus pixel 352 from different angles. For a given frame, the data captured by the left photodiode 354L may be referred to as the left image or left image data, while the data captured by the right photodiode 354R may be referred to as the right image or right image data. The left image data and the right image data may be compared to determine phase disparity. The pixel array 350 illustrated in FIG. 3A is a "sparse" 2PD pixel array in which only some of the pixels in the pixel array 350 include two photodiodes (namely, the focus pixels). The remaining pixels are imaging pixels and only include a single photodiode. In some cases, a "dense" 2PD pixel array may be used instead, in which every pixel in the pixel array (or a higher percentage of pixels in the pixel array) include two photodiodes, and can in some cases act as both focus pixels and imaging pixels simultaneously, or can switch between acting as a focus pixel for one frame and acting as an imaging pixel for another frame.

Figure 3B:
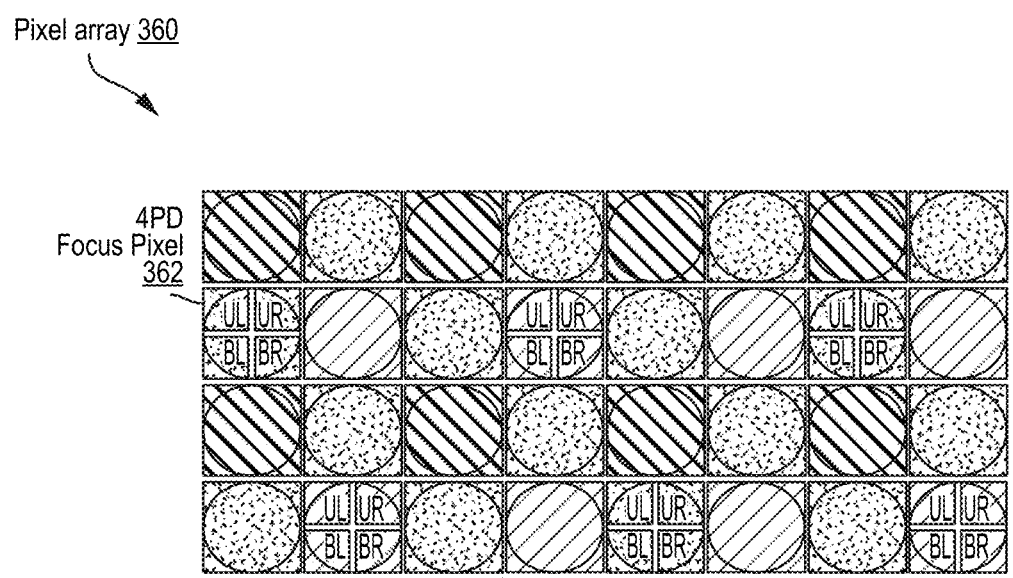
FIG. 3B is a diagram illustrating a top-down view of a pixel array configuration of an image sensor in which at least one focus pixel has four photodiodes, in accordance with some examples of the present disclosure.

FIG. 3B illustrates a top-down view of a pixel array configuration of an image sensor in which at least one focus pixel has four photodiodes. The pixel array 360 includes focus pixels in which each focus pixel includes four diodes, generally referred to as 4PD focus pixels or Quadrature Phase Detection (QPD) focus pixels. For example, a 4PD focus pixel 362 is labeled in FIG. 3B and includes an upper-left photodiode labeled with the letters "UL," an upper-right photodiode labeled with the letters "UR," a bottom-left photodiode labeled with the letters "BL," and a bottom-right photodiode labeled with the letters "BR." Data from each photodiode of the 4PD focus pixel 362 may be compared to data from an adjacent photodiode of the 4PD focus pixel 362 to determine phase difference. The pixel array 360 is a "sparse" 4PD pixel array in which only some of the pixels in the pixel array 360 include four photodiodes (namely, the focus pixels). The remaining pixels are imaging pixels and only include a single photodiode. In some cases, however a "dense" 4PD pixel array may be used instead, in which every pixel in the pixel array (or a higher percentage of pixels in the pixel array) include four photodiodes, and can in some cases act as both focus pixels and imaging pixels simultaneously, or can switch between acting as a focus pixel for one frame and acting as an imaging pixel for another frame.

Figure 4:
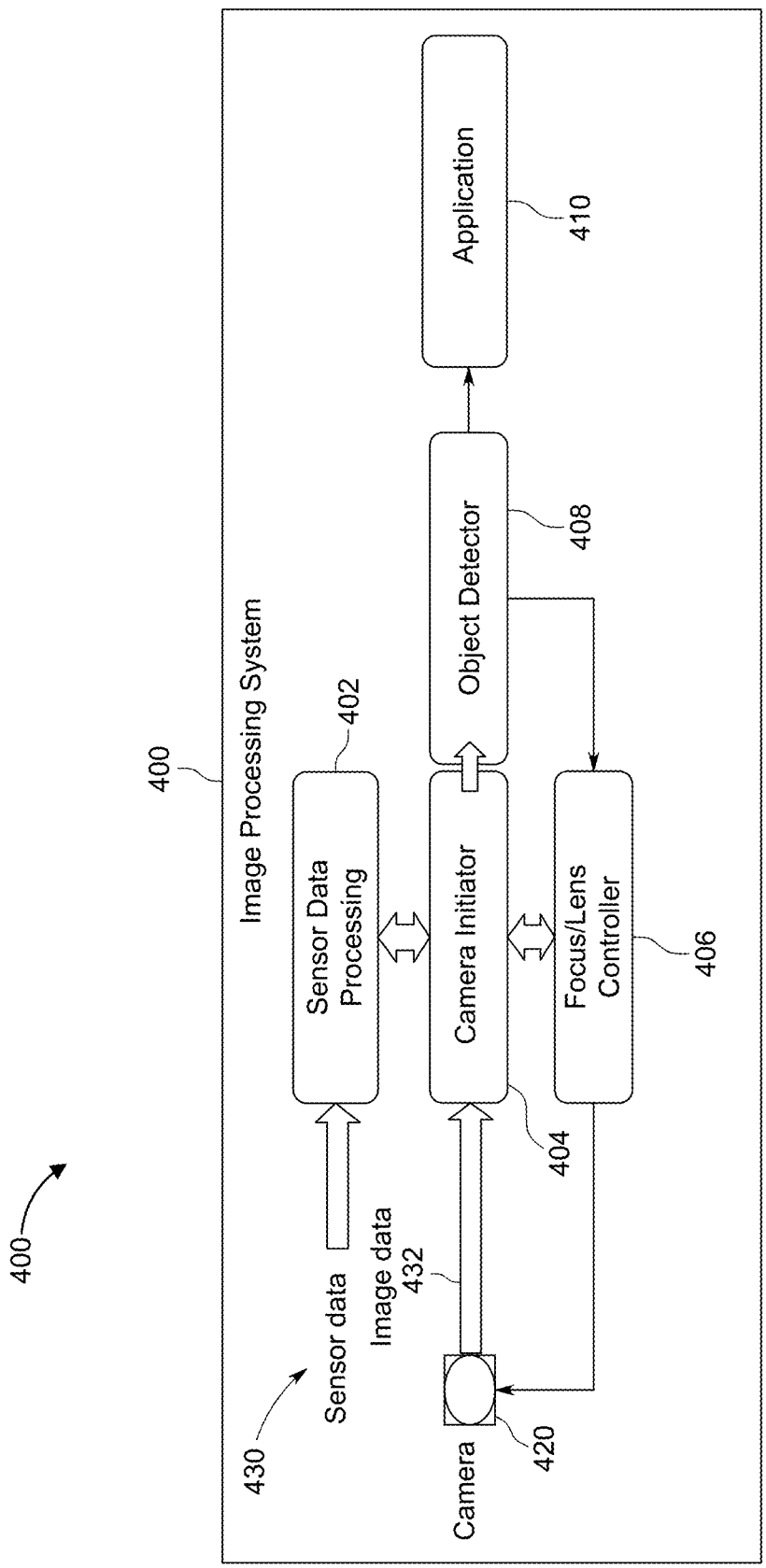
FIG. 4 is a diagram illustrating an example image processing system for low power variable focus object detection, in accordance with some examples of the present disclosure.

FIG. 4 is a diagram illustrating an example image processing system 400 for low power variable focus object detection. The image processing system 400 can be implemented by one or more computing devices such as, for example, a system-on-chip (SoC). In some examples, the image processing system 400 can be part of and/or implemented by the mobile device 102 shown in FIG. 1. The image processing system 400 can include a sensor data processing engine 402, a camera initiator 404, a focus/lens controller 406, and an object detector 408.

In some cases, the image processing system 400 can optionally include an application 410 associated with the object detection, such as an application accessed based on the object detection, an application configured to require authentication based on the object detection, an application that uses and/or receives the object detection results, and/or any other application. In other cases, the application 410 can be implemented by a separate system or a separate device(s) within the same system. In some examples, the focus/lens controller 406 can include and/or control a focus motor or controller. For example, the focus/lens controller 406 can include and/or control a voice-coil motor (VCM), piezoelectric motor, stepper motor, ultrasonic motor, electroactive polymer motor, liquid lens electrowetting device, electromagnetic focus motor, geared direct current (DC) motor, direct drive super sonic wave motor, solid state lens controller, or any other focus motor, controller, driver, actuator, and/or component.

The sensor data processing engine 402 can process sensor data 430 from one or more sensors, which is used to detect trigger events for initiating an object detection process as described herein. The sensor data 430 can include data from one or more sensors such as, for example and without limitation, a gyroscope, an accelerometer, an IMU, an audio sensor, an ambient light sensor, a depth sensor and/or laser range finder, an optical motion sensor, a barometer, a temperature sensor, an altimeter, a radar, a global positioning system (GPS) device, and/or any other type of sensor. In some examples, the sensor data 430 can include motion data, audio data, position data, location data, elevation data, an ambient light measurement, a temperature measurement, a distance measurement, a pressure measurement, radar returns, and/or any other type of sensor data.

The sensor data processing engine 402 can process the sensor data 430 and provide the processed sensor data to the camera initiator 404. The camera initiator 404 can use the processed sensor data and image data 432 from camera 420 to detect trigger events that can indicate presence of an object of interest to be detected and/or that can trigger an object detection process as described herein. In some examples, the camera initiator 404 can collect and/or coalesce a number of optical and/or non-optical trigger events that can indicate a presence of an object of interest to be detected.

Non-limiting examples of triggers that can be configured to trigger an object detection process as described herein can include inertial motion above a threshold, a gesture that can indicate an attempt/intent to start an object detection (e.g., a gesture indicating an attempt to scan an item such as a QR code or a document, a gesture indicating an attempt to scan/detect a face, a hand or finger gesture, etc.), a detection/indication of a presence of an object of interest (e.g., an inertial-sensor-based presence detection, an audio-sensor-based presence detection, a depth-sensor-based presence detection, etc.), an audio change above a threshold, an object-specific trigger (e.g., ultrasound signaling, a car noise, an animal noise, a human voice/speech, etc.), a light change above a threshold, a change in a range to an object above a threshold, a change in PD-based depth above a threshold, a trigger (e.g., an instruction, request, parameter, etc.) from an application, a trigger (e.g., a threshold measurement, etc.) from an active depth sensing system, a trigger from a GNSS/GPS, a trigger from a data connection (e.g., a Bluetooth connection, a Wi-Fi connection, a wireless local area network connection, a wide area network connection, etc.), and/or any other predetermined trigger or combination thereof. Moreover, non-limiting examples of objects of interest can include a QR code, a document, a face, a product, a hand, a finger, an animal, a sign, text, a symbol, an image, a landmark, a vehicle, a person, a device, and/or any other item(s) that can be captured and detected in an image.

The camera 420 can be implemented and/or part of the image processing system 400 or a device(s) implementing the image processing system 400. In some examples, the camera 420 can be or can be implemented by the front-facing camera 104 shown in FIG. 1. In other examples, the camera 420 can be a different camera implemented by the image processing system 400, a device implementing the image processing system 400, or any other device. In some cases, the camera 420 can be or can correspond to a lower-power camera, as previously described. In some examples, the camera 420 can be a low-power image sensor that passively captures images without requiring an explicit instruction based on user input requesting the capture of the images. In some examples, the camera 420 can persistently or periodically operate when the image processing system 400 is in one or more states, such as a low power state, a locked state, an active state, an inactive state, a charged state, and/or any other state.

The camera initiator 404 can analyze the image data 432 and the sensor data received from the sensor data processing engine 402 to detect one or more triggers for object detection. When the camera initiator 404 detects a trigger, the camera initiator 404 can send a signal to the object detector 408 to instruct/trigger the object detector 408 to determine whether an object of interest is or is not present in a scene. In some examples, the camera initiator 404 can also send the image data 432 (and optionally any sensor data from the sensor data processing engine 402) to the object detector 408, which can use such data to determine whether an object of interest is or is not present.

In some cases, the camera initiator 404 can optionally notify the focus/lens controller 406 of the detected trigger. For example, the camera initiator 404 can send to the focus/lens controller 406 an indication and/or description of the detected trigger. The focus/lens controller 406 can optionally use the information about the trigger, along with an output from the object detector 408, to control an operation and/or configuration of the camera 420 as described herein. For example, the focus/lens controller 406 can use information about the trigger (e.g., the time of the trigger, the type of trigger, a trigger parameter, etc.), along with an output from the object detector 408, to adjust a configuration of a lens (e.g., a lens position) associated with the camera 420.

The object detector 408 can analyze an image captured by the camera 420 (e.g., the image data 432) and generate a detection result, which can include an indication of a certainty, determination, prediction, confidence, and/or likelihood of an presence of an object of interest in the image. In some examples, the object detector 408 can analyze an image captured by the camera 420 (e.g., the image data 432) and generate an indication of a certainty, determination, prediction, confidence, and/or likelihood of an existence and/or non-existence of an object of interest. For example, the object detector 408 can analyze a captured image to determine whether an object of interest is present in the image and output a confidence value from 0 to 1 where 0 indicates that the object detector 408 is highly or maximally certain that an object of interest is not present in the image, 0.5 indicates that the object detector 408 is uncertain or maximally uncertain if an object of interest is present in the image, and a 1 indicates that the object detector 408 is highly or maximally certain that an object of interest is present in the image. The confidence value from 0 to 1 in this example is merely one illustrative example of a confidence value generated by the object detector 408, provided herein for explanation purposes. One of ordinary skill in the art will recognize from this disclosure that, in other examples, the object detector 408 can generate other types of confidence values and/or the confidence values can be based on other conventions. In other cases, the object detector 408 can instead or additionally generate a probability score or metric, a probabilistic prediction, a classification and/or label, a cost or loss function value, an estimate, a ranking, a binary prediction (e.g., "yes" or "no", "true" or "false", "present" or "not present", etc.), a set of probabilities, etc., to indicate whether an object of interest is or is not present.

In some aspects, the object detector 408 can implement one or more algorithms, networks, and/or statistical models to generate the confidence value based on the captured image. For example, in some cases, the object detector 408 can implement an image processing algorithm, a machine learning algorithm, a Bayesian network, conditional random fields, Markov chains, tensor factorization, neural networks, any combination thereof, or any other algorithm, network, and/or statistical model. The object detector 408 can determine that an object of interest is present in the image if a confidence value generated equals to or is above an upper threshold (e.g., the value 1 in the previous example). The object detector 408 can determine that the object of interest is not present in the image if the confidence value equals to or is below a lower threshold (e.g., the value of 0 in the previous example). The object detector 408 can indicate an uncertainty regarding whether the object of interest is or is not present in the image when a confidence value generated is above the lower threshold but below the upper threshold (e.g., above 0 and below 1 in the previous example).

In some cases, if the object detector 408 determines that the object of interest is present in the captured image and detects the object in the image, the object detector 408 can provide a detection output (e.g., a detection result) to the application 410. For example, the object detector 408 can notify the application 410 that the object has been detected in the image (e.g., the object is determined to be present in the image). As another example, the object detector 408 can provide the application 410 a detection result such as an indication and/or description of the detected object, a confidence value indicating that the object is present in the image, and/or any other information about the detected object and/or the detection of the object. In some examples, if the object detector 408 determines that the object of interest is present in the captured image, the object detector 408, the application 410, or the image processing system 400 can "wake up" or initialize another camera device implemented by the image processing system 400.

The other camera device can include, for example, a higher power/resolution camera device and/or image sensor. In some examples, the other camera device can capture higher resolution images than the camera 420, implement higher framerates than the camera 420, implement or invoke additional and/or more compute intensive image processing tasks/algorithms than camera 420, implement camera hardware with higher power and/or capabilities than camera 420, etc. The image processing system 400 can use the other camera to capture one or more images of a detected object (and/or other object(s) or portions of a scene) for further processing. In some examples, the image processing system 400 can use the other camera to process an image captured by the camera 420 (and/or by the other camera) at a lens position used to capture the image of the detected object, to recognize the detected object (e.g., recognize a QR code, recognize a face, recognize a device, etc.), etc.

In some cases, the image processing system 400 can switch back to the camera 420 from the other camera device when the image processing system 400 transitions to a different power state (e.g., a lower power state, a locked state, an inactive state, etc.), when an object of interest is not detected for a threshold period of time, when the other camera device is not used (and/or remains inactive) for a threshold period of time, etc. For example, the image processing system 400 can place the other camera device in an inactive, sleep, off, or lower power state, and initialize the camera 420 for use until another switch to the different camera device is triggered.

The object detector 408 can communicate with the focus/lens controller 406 to cause the focus/lens controller 406 to adjust a configuration of the camera 420, such as a position of a lens of the camera 420, based on a detection result from the object detector 408, such as a confidence value generated by the object detector 408. For example, if the object detector 408 determines that the object of interest is not present in the image, the object detector 408 can notify the focus/lens controller 406 that the object is not present in the image. The focus/lens controller 406 can determine an action to perform based on the notification that the object is not present in the image. For example, the focus/lens controller 406 can instruct the camera 420 to turn off if no object of interest has been detected in the image.

As another example, if the object detector 408 is unable to determine with a certainty threshold that an object of interest is or is not present in the image (e.g., if the confidence value is above a lower threshold but below an upper threshold), the object detector 408 can notify the focus/lens controller 406 of such uncertainty to cause the focus/lens controller 406 to adjust a configuration of the camera 420, such as a position of a lens and/or a lens aperture, and trigger the camera 420 to capture another image using the adjusted configuration. The object detector 408 can use the other image captured using the adjusted configuration (e.g., adjusted lens position, adjusted lens aperture, etc.) to make another determination regarding whether an object of interest is present or not. Based on the adjusted configuration, the other image captured by the camera 420 can have one or more different properties/characteristics (e.g., focus/sharpness, quality, etc.) than the previous image used by the object detector 408 to determine whether the object of interest is or is not present in the image. The other image with the one or more different properties/characteristics may allow the object detector 408 to determine with more certainty whether the object of interest is or is not present.

The focus/lens controller 406 can adjust one or more configurations associated with the camera 420 based on the detection results (e.g., confidence value, etc.) from the object detector 408 and, optionally, further based on trigger information from the camera initiator 404. For example, the focus/lens controller 406 can control, based on events/information from the object detector 408 (and optionally from the camera initiator 404), the image sensor focus, a power setting of the camera 420, and/or one or more other configuration settings such as an aperture, for example. To illustrate, in some cases, the focus/lens controller 406 can adjust a lens position to change a focal distance for capturing (e.g., via the camera 420) one or more images with different properties/characteristics (e.g., focus/sharpness, quality, etc.) that the object detector 408 can use to make a more certain/precise object presence determination and/or object detection.

As another example, the focus/lens controller 406 can adjust an aperture used by the camera 420 to change a depth-of-field and/or one or more other properties/characteristics of any additional images captured by the camera 420 and used by the object detector 408 to determine whether an object of interest is present and/or to detect the object. As another example, the focus/lens controller 406 can generate an instruction to turn off the camera 420 (and/or stop capturing additional images until a further instruction) if the confidence value from the object detector 408 indicates that an object of interest is not present in the image.

Some focus technologies, such as piezoelectric motor or a stepper motor, may not have a neutral focal distance. Moreover, some focus technologies may have non-linear or temporal elements to their focus power functions. In some cases, these focus technologies may also be incorporated into the logic of the focus/lens controller 406. For example, for a piezoelectric focus motor, which may only draw power when moving the lens, the focus/lens controller 406 can prioritize checking focal distances close to the current focal distance to avoid changing the focus as much as possible.

As further described herein, the focus/lens controller 406 can intelligently select configuration adjustments (e.g., lens position and focal distance, lens aperture, etc.) to reduce or minimize the amount of power consumed by the camera 420 and/or a lens motor/driver associated with the camera 420 when performing object detection and object detection decisions. Moreover, the image processing system 400 can serially perform one or more iterations of the object detection checks/tests and camera/lens adjustments described above, until the object detector 408 determines with a threshold confidence that an object of interest is or is not present. The image processing system 400 can intelligently perform each iteration in a manner to decrease the power consumed in determining whether an object of interest is present and, if the object of interest is present, detecting the object. In some cases, the image processing system 400 can intelligently perform each iteration in a manner that also increases the probability of detecting an object of interest, increases the probability of making a detection decision (e.g., object detected, object present, object not present) that satisfies a confidence threshold, and/or decreases the amount of time (and/or the amount of attempts/iterations) it takes in making such a detection decision and/or completing an object detection process.

Figure 5:
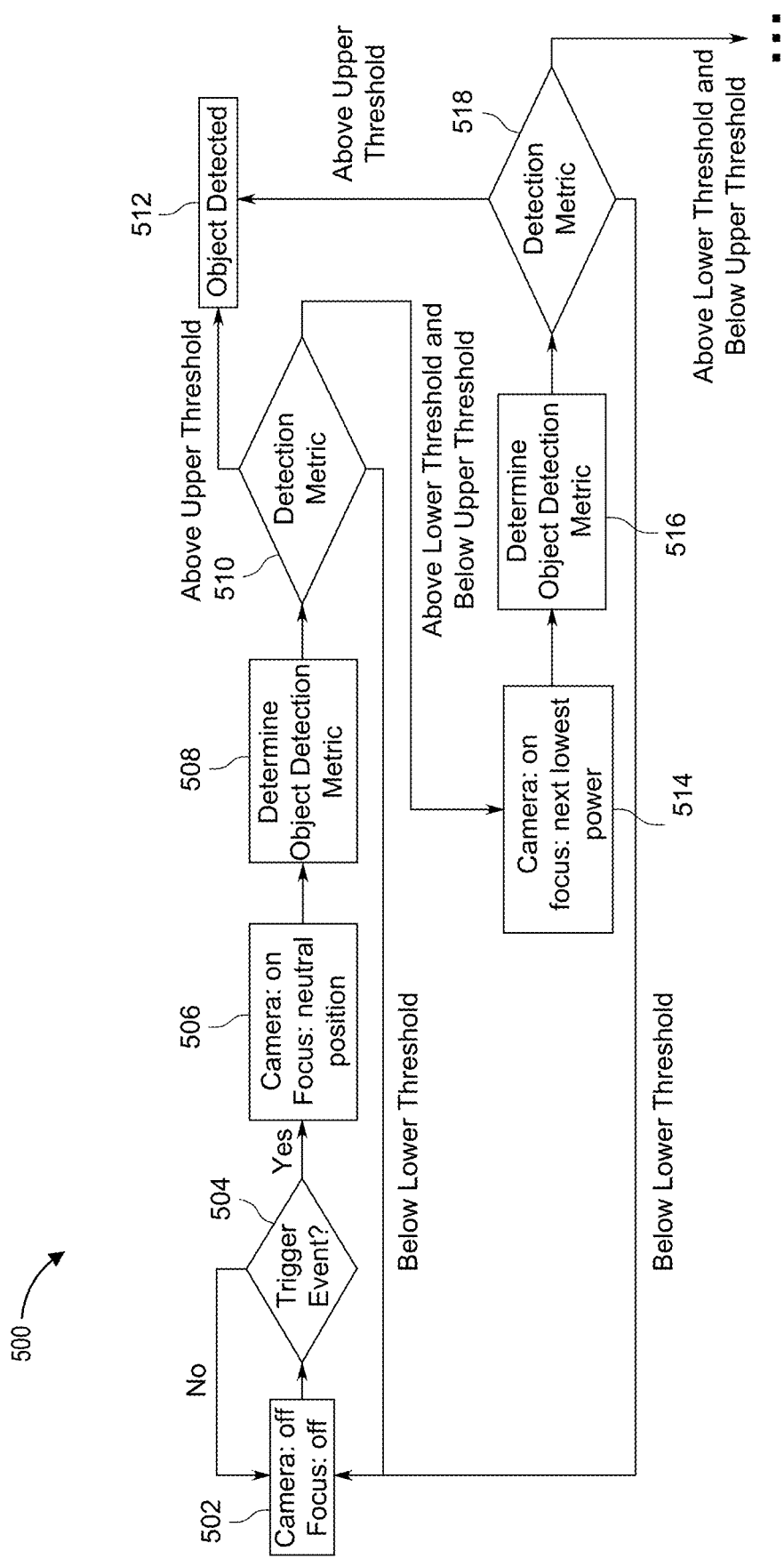
FIG. 5 is a diagram illustrating an example process for low power, variable focus object detection, in accordance with some examples of the present disclosure.

FIG. 5 is a diagram illustrating an example process 500 for low power, variable focus object detection. In some examples, the process 500 can reduce or limit the amount of power consumed by a focus controller device, such as a focus motor. For example, the process 500 can reduce power consumption by reducing or minimizing the time spent by a lens focused away from a neutral position and/or the amount and/or magnitude of lens position changes performed by the system. In some examples, the neutral position can be a position that consumes the least amount of power to reach/achieve and/or maintain. In some examples, the neutral position can be a non-powered position and/or a position associated with a lower power draw than a non-neutral or other position.

At block 502, the process 500 can start with the camera system (e.g., front-facing camera 104, camera 420) in an off state (e.g., focus off, power off). At block 504, the process 500 can determine whether a trigger event has occurred. The trigger event can indicate that an object of interest may be present in a scene. Moreover, the trigger event can be an event configured to trigger an object detector (e.g., object detector 408) to determine whether an object of interest is present in a scene. Non-limiting examples of objects of interest can include a QR code, a document, a face, a product, a hand, a finger, an animal, a sign, text, a symbol, an image, a landmark, a device, a person, a vehicle, and/or any other item(s) that can be captured and detected in an image.

Moreover, a trigger event can include, for example and without limitation, detection of inertial motion above a threshold, a gesture that can indicate an attempt/intent to start an object detection (e.g., a gesture indicating an attempt to scan an item such as a QR code or a document, a gesture indicating an attempt to scan/detect a face, a hand or finger gesture, etc.), a detection/indication of a presence of an object of interest (e.g., an inertial-sensor-based presence detection, an audio-sensor-based presence detection, a depth-sensor-based presence detection, etc.), an audio change above a threshold, an object-specific trigger (e.g., ultrasound signaling, a car noise, an animal noise, a human voice/speech, etc.), a light change above a threshold, a change in a range to an object above a threshold, a change in PD-based depth above a threshold, and/or any other predetermined trigger or combination thereof.

The process 500 can analyze image data from the camera system to determine whether the trigger event is detected. In some cases, the process 500 can also analyze other sensor data (e.g., sensor data 430), as previously explained. If a trigger event is not detected, the process 500 can return to block 502 and maintain the camera system in the off state. If a trigger event is detected, at block 506, the process 500 can turn the camera system on with a lens of the camera system in a neutral position.

At block 508, the process 500 can determine whether an object of interest is or is not present based on an image captured by the camera system using the neutral position (e.g., while the lens is in the neutral position). In some examples, the presence determination is based on an object detection metric indicative of a confidence that the object of interest is or is not present in the image.

At block 510, the process 500 can determine whether the object detection metric is above or below one or more detection thresholds. In some examples, the one or more confidence thresholds can include an upper threshold that corresponds to a certainty/likelihood threshold that the object of interest is present in the image, and a lower threshold that corresponds to a certainty/likelihood threshold that the object of interest is not present in the image.

If the object detection metric is above or at the upper threshold, at block 512, the process 500 can determine that the object of interest has been detected. In some cases, if the object of interest is detected at block 512, the process 500 can "wake up" or initialize a different image sensor and/or camera system with higher/additional capabilities (e.g., higher resolution, higher framerates, higher power state, etc.). If the object detection metric is below or at a lower threshold, the process 500 can return to block 502. For example, the process 500 can power off the camera system if the object detection metric indicates that the object of interest is not present in the image.

If the object detection metric is above the lower threshold but below the upper threshold, at block 514, the process 500 can adjust a focus of the camera system by moving the lens to a next lowest power position (e.g., relative to the neutral power position). The next lowest power position can be a different lens position than the neutral position that requires the least amount of power to achieve relative to other available/possible lens positions. For example, the next lowest power position can be the lens position determined to involve the least amount of power draw from the focus motor/controller to achieve. To illustrate, the power consumed by the focus motor/controller to move the lens to different positions can vary, with some positions involving more power consumption by the focus motor/controller than other positions. The lens position that requires the least amount of power consumption by the focus motor/controller to move the lens to (excluding the neutral position which was already implemented at block 506) can be the next lowest power position referenced in block 514. Thus, at block 514, the process 500 can include moving the lens to that particular lens position involving the least amount of power consumption by the focus motor/controller (excluding the neutral position which was already implemented at block 506).

At block 516, the process 500 can make an additional determination on whether the object of interest is or is not present based on another image captured by the camera system using the next lowest power position. In some examples, the additional presence determination is based on an additional object detection metric indicative of a confidence that the object of interest is or is not present in the image.

At block 518, the process 500 can determine whether the additional object detection metric is above or below one or more thresholds. In some examples, if the additional object detection metric is above or at the upper threshold, at block 512, the process 500 can determine that the object of interest has been detected. If the additional object detection metric is below or at a lower threshold, the process 500 can return to block 502. For example, the process 500 can power off the camera system if the additional object detection metric indicates that the object of interest is not present in the image.

If the additional object detection metric is above the lower threshold but below the upper threshold, the process 500 can again adjust a focus of the camera system by moving the lens to the next lowest power position (e.g., the lens position associated with more power consumption than the next lowest power position from block 514 but less power consumption than any other lens positions available/possible for that camera system). The process 500 can serially perform object presence checks described above with incremental increases in power consumption until the process 500 detects the object, determines that the object is not present, or finishes testing every available/possible lens position for that camera system. In this way, the process 500 can search for the focus and lens position that yields an image of sufficient quality to detect the object or determine that the object is not present, while reducing or minimizing the amount of power used to find such focus and lens position. For example, before implementing a focus and lens position that involves higher focus motor/controller power consumption, the process 500 can first check any focus and lens position that involves less focus motor/controller power consumption, which may lead to a detection using a lower amount of power.

Figure 6:
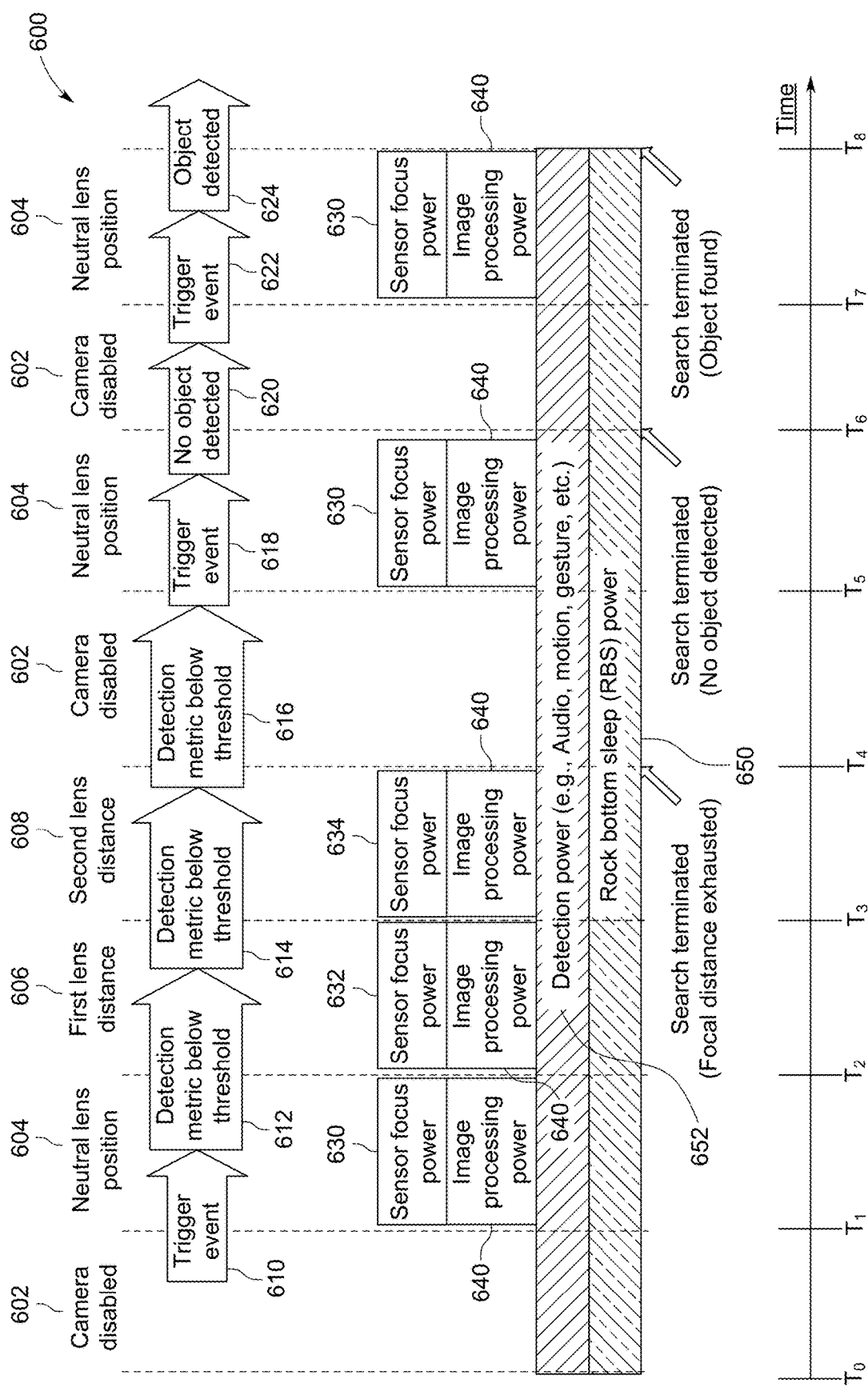
FIG. 6 is a diagram illustrating an example timeline of focus adjustments and associated power profiles, in accordance with some examples of the present disclosure.

FIG. 6 is a diagram illustrating an example timeline 600 of focus adjustments and associated power profiles. The power profiles include detection power 652, rock bottom sleep (RBS) power 650, sensor focus power 630 through 634, and image processing power 640. The power profiles include detection power 652, rock bottom sleep (RBS) power 650, sensor focus power 630 through 634, and image processing power 640 are respectively represented in FIG. 6 by blocks, and the relative magnitudes of power of the detection power 652, RBS power 650, sensor focus power 630 through 634, and image processing power 640 are represented by the relative (illustrative) sizes of the blocks representing the power profiles include detection power 652, rock bottom sleep (RBS) power 650, sensor focus power 630 through 634, and image processing power 640.

In the example shown in FIG. 6, the camera system is at a disabled state 602 between time $T_0$ and time $T_1$. In the disabled state 602, the camera system consumes detection power 652 and RBS power 650. The detection power 652 can include a small amount of power consumed to process sensor data and detect a trigger event as previously described. The RBS power 650 (or rock bottom sleep current or RBSC) can represent a minimum power level of the camera system (e.g., a minimum amount of power used by the camera system to operate and/or when not completely powered off). The RBS power 650 and the detection power 652 involve the least amount of power consumption, as represented by the smaller, relative sizes of the blocks representing the RBS power 650 and the detection power 652 (relative to the blocks corresponding to the sensor focus powers and image processing powers).

At $T_1$ (or before $T_1$), the camera system detects trigger event 610, which can indicate an object of interest may be present, and can initiate an object detection process, such as process 500 described above with respect to FIG. 5. Based on trigger event 610, the camera system sets the lens to a neutral lens position 604. The neutral lens position 604 can be a non-powered lens position or a lens position associated with the lowest amount of focus motor/controller power from the various lens positions available/possible at the camera system. In some examples, the neutral lens position 604 can correspond to an infinity focus (also referred to as focus to infinity).

The camera system maintains the neutral lens position 604 between time $T_1$ and time $T_2$. At the neutral lens position 604, the camera system consumes a lowest sensor focus power 630 (e.g., as represented by the relative size of the block corresponding to the lowest sensor focus power 630) and image processing power 640, in addition to the detection power 652 and the RBS power 650. Based on an image captured by the camera system while in the neutral lens position 604, the camera system determines an object detection metric 612 object detection metric 612 that estimates whether the object of interest is present in the captured image. In some examples, the object detection metric 612 can include a confidence value indicating a certainty, likelihood, estimate, etc., regarding whether an object of interest is present in the captured image. The object detection metric 612 in this example is below an upper threshold and above a lower threshold (e.g., as indicative by the camera system not returning to the disabled state 602 after determining the object detection metric 612).

Based on the object detection metric 612 being below the upper threshold and above the lower threshold, the camera system adjusts a lens position to a first lens position 606 to check/test whether the object can be detected within the upper threshold confidence when the lens is at the first lens position 606. The camera system maintains the first lens position 606 between time $T_2$ and time $T_3$. The first lens position 606 can include the image processing power 640 and a next lowest sensor focus power 632, in addition to the detection power 652 and the RBS power 650. As shown, the next lowest sensor focus power 632 associated with the first lens position 606 includes more power consumption than the lowest sensor focus power 630 associated with the neutral position 604, but less power consumption than the higher sensor focus power 634 associated with the second lens position 608. For example, a focus motor/controller of the camera system draws more power to change the lens of the camera system to the first lens position 606 than to the neutral lens position 604, but draws less power to change the lens of the camera system to the first lens position 606 than to the second lens position 608.

Based on an image captured by the camera system with the first lens position 606, the camera system determines an object detection metric 614 (e.g., a second confidence value) that estimates whether the object of interest is present in the captured image. The object detection metric 614 in this example is again below an upper threshold and above a lower threshold (e.g., as indicative by the camera system not returning to the disabled state 602 after determining the object detection metric 614). Thus, based on the object detection metric 614 being below the upper threshold and above the lower threshold, the camera system again adjusts a lens position to the second lens position 608 to check/test whether the object can be detected within the upper threshold confidence when the lens position is at the second lens position 608. The camera system maintains the first lens position 606 between time $T_3$ and time $T_4$.

The second lens position 608 can include the image processing power 640 and a higher sensor focus power 634, in addition to the detection power 652 and the RBS power 650. As shown, the higher sensor focus power 634 associated with the second lens position 608 includes more power consumption than the lowest sensor focus power 630 associated with the neutral position 604 and the next lowest sensor focus power 632 associated with the first lens position 606. For example, the focus motor/controller draws more power to change the lens of the camera system to the second lens position 608 than to the neutral lens position 604 and the first lens position 606.

Based on an image captured by the camera system with the second lens position 608, the camera system determines an object detection metric 616 that estimates whether the object of interest is present in the captured image. In some cases, the object detection metric 616 in this example is below an upper threshold and a lower threshold (e.g., as indicative by the camera system not returning to the disabled state 602 after determining the object detection metric 614). Thus, based on the object detection metric 614 being below the upper threshold and the lower threshold, the camera system transitions to the disabled state 602. In other cases, if the second lens position 608 is the last lens position that has not been checked/tested by the camera system and the object detection metric 616 is still below the upper threshold, the camera system can transition to the disabled state 602 even if the object detection metric 616 is above the lower threshold.

The camera system remains in the disabled state 602 between time $T_4$ and time $T_5$. While in the disabled state 602, the camera system detects a trigger event 618 and transitions to the neutral lens position 604. The camera system remains at the neutral lens position 604 between time $T_5$ and time $T_6$. The camera system can capture an image based on the neutral lens position 604, and use the captured image to determine an object detection metric 620 that the object is or is not present in the image. In this example, the object detection metric 620 is at or below a lower confidence threshold. Thus, the camera system determines that no object has been detected and/or is present in the image.

The camera system then transitions back to the disabled state 602 and remains in the disabled state 602 between time $T_6$ and time $T_7$. When the camera system detects trigger event 622, the camera system changes to the neutral lens position 604. The camera system maintains the neutral lens position 604 between time $T_7$ and time $T_5$. The camera system captures an image based on the neutral lens position 604 and determines a object detection metric 624 that the object is or is not present in the image. In this example, the object detection metric 624 is at or above the upper threshold confidence. Therefore, based on the object detection metric 624, the camera system can detect the object and/or determine that the object is present in the image.

In some cases, if the camera system detects the object and/or determines that the object is present in the image (e.g., based on the object detection metric 624), an electronic device (e.g., mobile device 102) implementing the camera system can "wake up" or initialize a different camera system implemented by the electronic device. The different camera system can include a camera system with higher/additional image capturing and/or image processing capabilities, such as higher resolution, higher framerate(s), higher power state(s)/mode(s). In some examples, the different camera system can implement and/or invoke additional and/or more compute intensive image processing tasks/algorithms. The different camera system can be implemented to capture one or more images of the detected object for further processing and/or one or more images of a scene and/or other objects in a scene. In some examples, the electronic device can use the different camera system to process an image captured by the camera system at a focal distance used to capture the image of the detected object, to recognize the detected object (e.g., recognize a QR code, recognize a face, recognize a device, etc.), etc.

In some cases, the electronic device can switch back to the camera system (e.g., from the different camera system) when the electronic device transitions to a different power state (e.g., a lower power state, a locked state, an inactive state, a different power mode, etc.), when an object of interest is not detected for a threshold period of time, when the different camera system is not used (and/or remains inactive) for a threshold period of time, etc. For example, the electronic device can place the different camera system in an inactive, sleep, off, or lower power state, and initialize the camera system for use until another switch to the different camera system is triggered.

As shown in FIG. 6, the camera system can serially test different lens positions/focal distances starting with those that involve the least amount of power consumption and serially checking/testing any additional ones (as needed) selected in an order from lower power consumption to higher power consumption. As further described herein, in other examples, the camera system can select which lens positions/focal distances to check based on a different selection order (e.g., instead of or in addition to a lower to higher power consumption order/criteria), such as based on a reward-to-risk selection order, a selection order that is based on a distance and/or power consumption relative to a current distance/lens position, and/or any other selection order and/or criteria.

Figure 7:
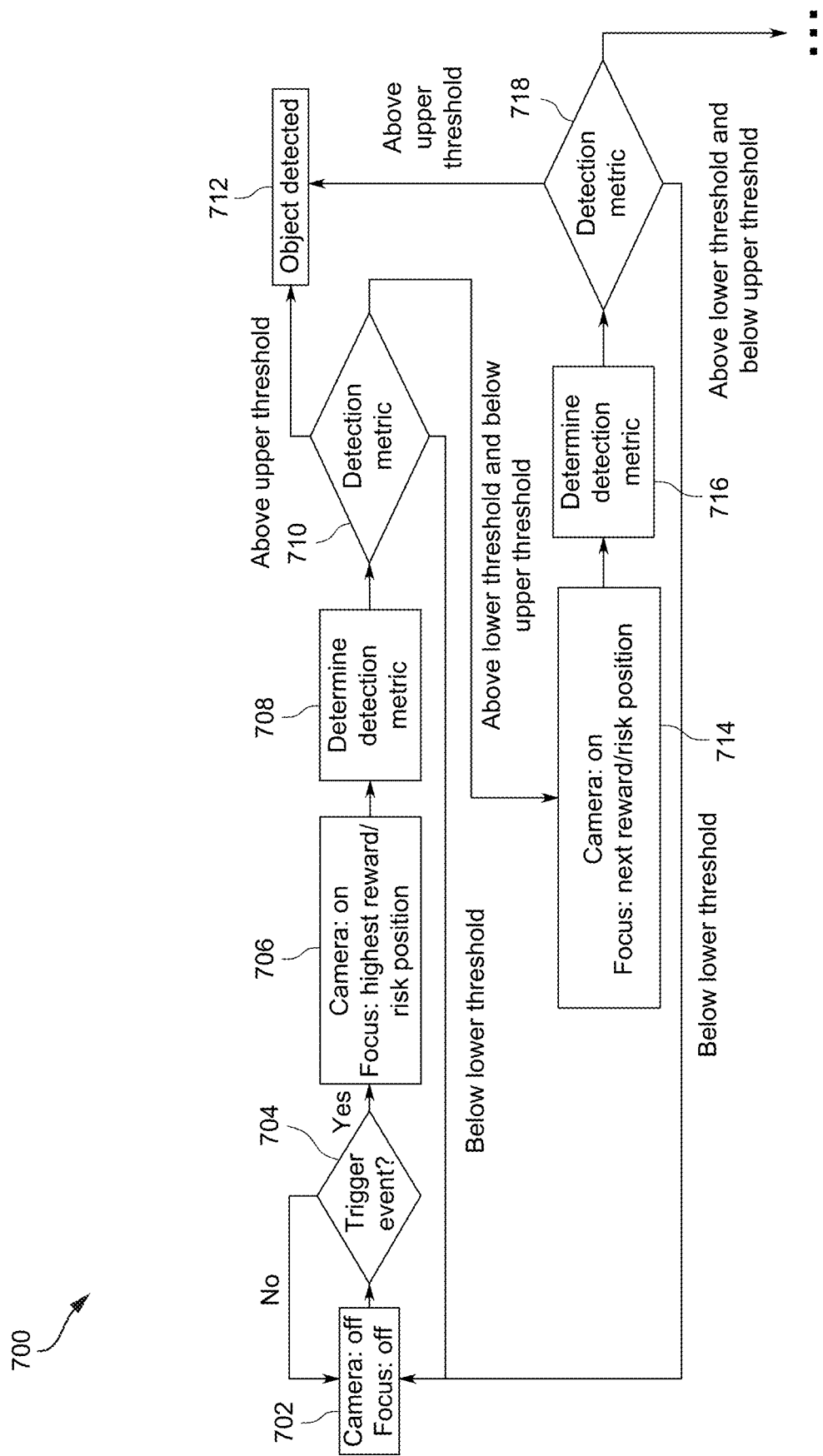
FIG. 7 is a diagram illustrating an example process for low power, variable focus object detection, in accordance with some examples of the present disclosure.

FIG. 7 is a diagram illustrating another example process 700 for low power, variable focus object detection. In this example, the process 700 can prioritize certain focal distances based on a risk and reward analysis/determination.

For example, at block 702, the process 700 can start with the camera system (e.g., front-facing camera 104, camera 420) in an off state (e.g., focus off, power off). At block 704, the process 700 can determine whether a trigger event has occurred. If a trigger event is detected, at block 706, the process 700 can turn the camera system on with a lens of the camera system in a selected position. Here, the position of the lens can be selected based on a risk and reward determination.

For example, the position of the lens selected at block 706 can be a position with a highest/best reward to risk assessment or comparison. The reward associated with a position can include and/or correspond to an object detection metric providing an indication and/or estimated likelihood/certainty that the object of interest will be detected with the lens in that position. The risk associated with a position can include and/or correspond to an object detection metric providing an indication and/or estimated likelihood/certainty that the object of interest will not be detected with the lens in that position, and thus moving the lens to that position can risk unnecessary power consumption (e.g., a power draw to move the lens to that position that does not yield an objection detection and/or a threshold object detection certainty).

In some cases, the risk/reward determination for the various lens positions can be based on an estimated range/distance of the object of interest. The estimated range/distance can provide insight into the likelihood of achieving an object detection (or a determination that the object of interest is not present) from the various lens positions and/or insight into what lens position(s) may be more/most likely to yield a detection (or a determination that the object of interest is not present). In some cases, the likelihood of achieving an object detection (or a determination that the object of interest is not present) estimated for a particular lens position can indicate, reflect and/or correspond to a reward (and/or can be used to determine a reward value) of using that particular lens position if the likelihood is high and/or higher than the likelihood estimated for other lens positions. In some cases, the likelihood of achieving an object detection (or a determination that the object of interest is not present) estimated for a particular lens position can indicate, reflect and/or correspond to a risk (and/or can be used to determine a risk value) of using that particular lens position if the likelihood is low and/or lower than the likelihood estimated for other lens positions.

Moreover, in some cases, the amount of power consumption used to move the lens to a particular lens position can indicate, reflect, and/or correspond to a risk of using that particular lens position if the amount of power consumption is high and/or higher than that of other lens positions. In some cases, the amount of power consumption used to move the lens to a particular lens position can also indicate, reflect, and/or correspond to a reward of using that particular lens position if the amount of power consumption is low and/or lower than that of other lens positions.

In some implementations, a trigger event(s) (and/or information about the trigger event(s)) and/or the sensor data (e.g., sensor data 430 and/or image data 432) used to detect the trigger event(s) can be used to determine a risk/reward value for a lens position. For example, a trigger event, the information associated with the trigger event, and/or the sensor data used to detect the trigger event can provide an indication of a distance/range of an object of interest, which can then be used to determine which lens position(s) may be more/most likely to yield an object detection for an object at that distance/range based on focal distances and/or any other focus characteristics associated with the various lens positions available/possible for the camera system.

In some examples, a trigger event, the information associated with the trigger event, and/or the sensor data used to detect the trigger event can be used as an input to a risk/reward function in the focus/lens controller 406 to determine risk/reward values for various lens positions. In some cases, the focus/lens controller 406 can prioritize higher-power lens positions (e.g., focal distances) if the risk/reward function provides a higher/higher indication/likelihood of a possible object of interest at the higher-power lens positions (e.g., focal distances). For example, in some cases, the focus/lens controller 406 can prioritize a higher-power lens position over a lower-power lens position if the reward estimated for the higher-power lens position is high (e.g., at or above a certain threshold) and/or higher than the reward estimated for one or more lower-power lens positions, and/or if the risk estimated for the higher-power lens position is low (e.g., at or below a certain threshold) and/or lower than the risk estimated for one or more lower-power lens positions. To illustrate, the focus/lens controller 406 can prioritize the second lens position 608 shown in FIG. 6 over the first lens position 606 and/or the neutral lens position 604 shown in FIG. 6, if the reward estimated for the second lens position 608 is high (e.g., at or above a certain threshold) and/or higher than the reward estimated for the neutral lens position 604 and/or the first lens position 606, and/or if the risk estimated for the second lens position 608 is low (e.g., at or below a certain threshold) and/or lower than the risk estimated for the neutral lens position 604 and/or the first lens position 606.

At block 708, the process 700 can determine an object detection metric (e.g., confidence value) for the selected lens position (e.g., the lens position selected at block 706) based on an image captured by the camera system using the selected lens position. The object detection metric can include a value indicating a confidence that the object of interest is or is not present in the image.

At block 710, the process 700 can determine whether the detection metric (e.g., confidence value) is above or below one or more confidence thresholds. In some examples, the one or more confidence thresholds can include an upper threshold that corresponds to a threshold certainty/likelihood that the object of interest is present in the image, and a lower threshold that corresponds to a threshold certainty/likelihood that the object of interest is not present in the image.

If the detection metric is above or at the upper threshold, at block 712, the process 700 can determine that the object of interest has been detected. In some examples, if the process 700 determines that the object of interest has been detected, the process 700 can "wake up" or initialize a different camera system. The different camera system can include, for example, a higher power/resolution camera system. In some examples, the different camera system can capture higher resolution images, implement higher framerates, implement or invoke additional and/or more compute intensive image processing tasks/algorithms, implement camera hardware with higher power and/or capabilities, etc. The process 700 can use the different system to capture one or more images of a detected object (and/or other object(s) or portions of a scene) for further processing. In some examples, the process 700 can use the different camera system to process an image captured by the camera system (and/or by the different camera system) at a lens position used to capture the image of the detected object, to recognize the detected object (e.g., recognize a QR code, recognize a face, recognize a device, etc.), etc.

In some cases, the process 700 can switch back to the camera system (e.g., from the different camera system) when the electronic device (e.g., mobile device 102) implementing the camera systems transitions to a different power state (e.g., a lower power state, a locked state, an inactive state, etc.), when an object of interest is not detected for a threshold period of time, when the different camera system is not used (and/or remains inactive) for a threshold period of time, etc. For example, the process 700 can place the different camera system in an inactive, sleep, off, or lower power state, and initialize the camera system for use until another switch to the different camera system is triggered.

If the detection metric is below or at a lower threshold, the process 700 can return to block 702. For example, the process 700 can power off the camera system if the detection metric indicates that the object of interest is not present in the image. If the detection metric is above the lower threshold but below the upper threshold, at block 714, the process 700 can adjust a focus of the camera system by moving the lens to a different selected lens position. The different selected lens position can similarly be selected based on risk/reward values estimated for that different selected lens position and any other lens position. In some examples, the different selected lens position can be a lens position with a next best risk/reward value (e.g., having a highest reward to risk ratio or assessment/comparison after the lens position selected at block 706).

At block 716, the process 700 can determine an additional detection metric based on another image captured by the camera system using the different selected lens position. At block 718, the process 700 can determine whether the additional detection metric is above or below one or more confidence thresholds. In some examples, if the additional detection metric is above or at the upper threshold, at block 712, the process 700 can determine that the object of interest has been detected. If the additional detection metric is below or at a lower threshold, the process 700 can return to block 702, where the process 700 can power off the camera system.

If the additional detection metric is above the lower threshold but below the upper threshold, the process 700 can again adjust a focus of the camera system by moving the lens to an additional lens position selected based on a risk/reward determination as previously described. The process 700 can serially perform the detection confidence checks described above for lens positions selected based on risk/reward values, such as risk/reward ratios or risk/reward assessments/comparisons, until the process 700 detects the object, determines that the object is not present, or finishes testing every available/possible lens position for that camera system. In this way, the process 700 can search for the focus and lens position that yields an image of sufficient quality to detect the object or determine that the object is not present, while reducing or minimizing the amount of power used to find such focus and lens position and/or while increasing or maximizing the potential reward to risk ratio or assessment.

Figure 8:
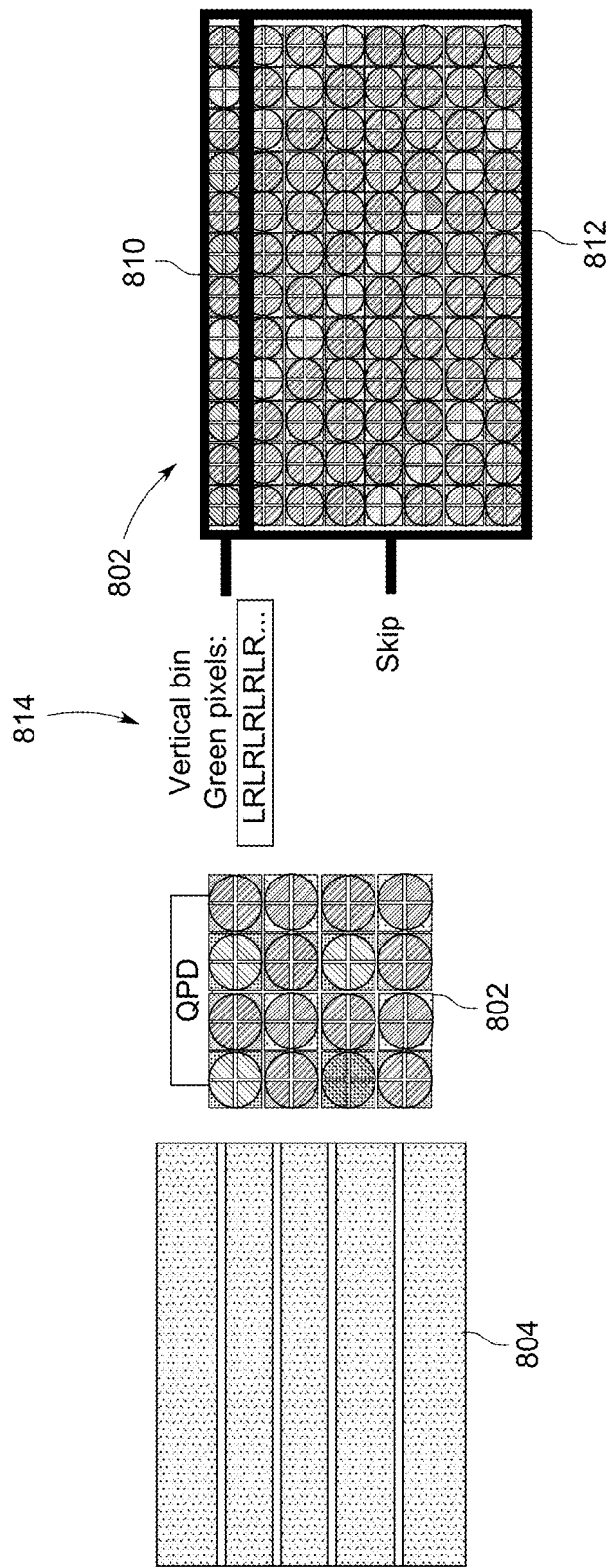
FIG. 8 is a diagram illustrating an example use of phase detection autofocus data to estimate a distance of an object of interest within a field-of-view of the camera system, in accordance with some examples of the present disclosure.

FIG. 8 is a diagram illustrating an example use of PDAF data to estimate/detect a distance of an object(s) of interest within a FOV of the camera system. In some examples, the camera system can use the PDAF data (and/or the distance of the object of interest estimated/detected based on the PDAF data) to detect a trigger event. In some cases, the camera system can use the PDAF data (and/or the distance of the object of interest estimated/detected based on the PDAF data) to determine risk/reward values for selecting a lens position as previously described with respect to process 700 shown in FIG. 7. In some cases, the camera system can use the PDAF data (and/or the distance of the object of interest estimated/detected based on the PDAF data) as part of an ongoing autofocus correction.

In FIG. 8, the pixel array 802 includes focus pixels in which each focus pixel includes four diodes, generally referred to as 4PD focus pixels or Quadrature Phase Detection (QPD) focus pixels, as previously described with respect to FIG. 3D. For example, a 4PD focus pixel in the pixel array 802 can include an upper-left photodiode, an upper-right photodiode, a bottom-left photodiode, and a bottom-right photodiode. Data from each photodiode of the 4PD focus pixel may be compared to data from an adjacent photodiode of the 4PD focus pixel to determine phase difference.

The camera system can use partial PDAF data from the pixel array 802 to detect a distance of objects inside the FOV of the image sensor as a trigger event. The image sensor can sample the PDAF data on some lines, while skipping most of the lines. The image can have a high density horizontally to allow accurate PDAF processing. In some examples, the PD data can provide reliable results even on a single PDAF line. In some cases, the QPD sensor (e.g., pixel array 802) can bin data from two lines to generate L/R interleaved PDAF data. In some examples, binning more lines can allow working at lower light levels.

To illustrate, the camera system can use partial PDAF data from the readout 804 of the pixel array 802 to detect a distance of objects inside the FOV of the image sensor. The image sensor can sample the PDAF data on a portion of lines 810, while skipping a larger portion of lines 812. In some examples, the QPD sensor (e.g., pixel array 802) can bin data from two lines to generate L/R interleaved PDAF data 814. In some cases, the portion of lines 810 can be sampled from an edge of the pixel array 802 added to a bin, such as a top, bottom, or side edge.

Figure 9:
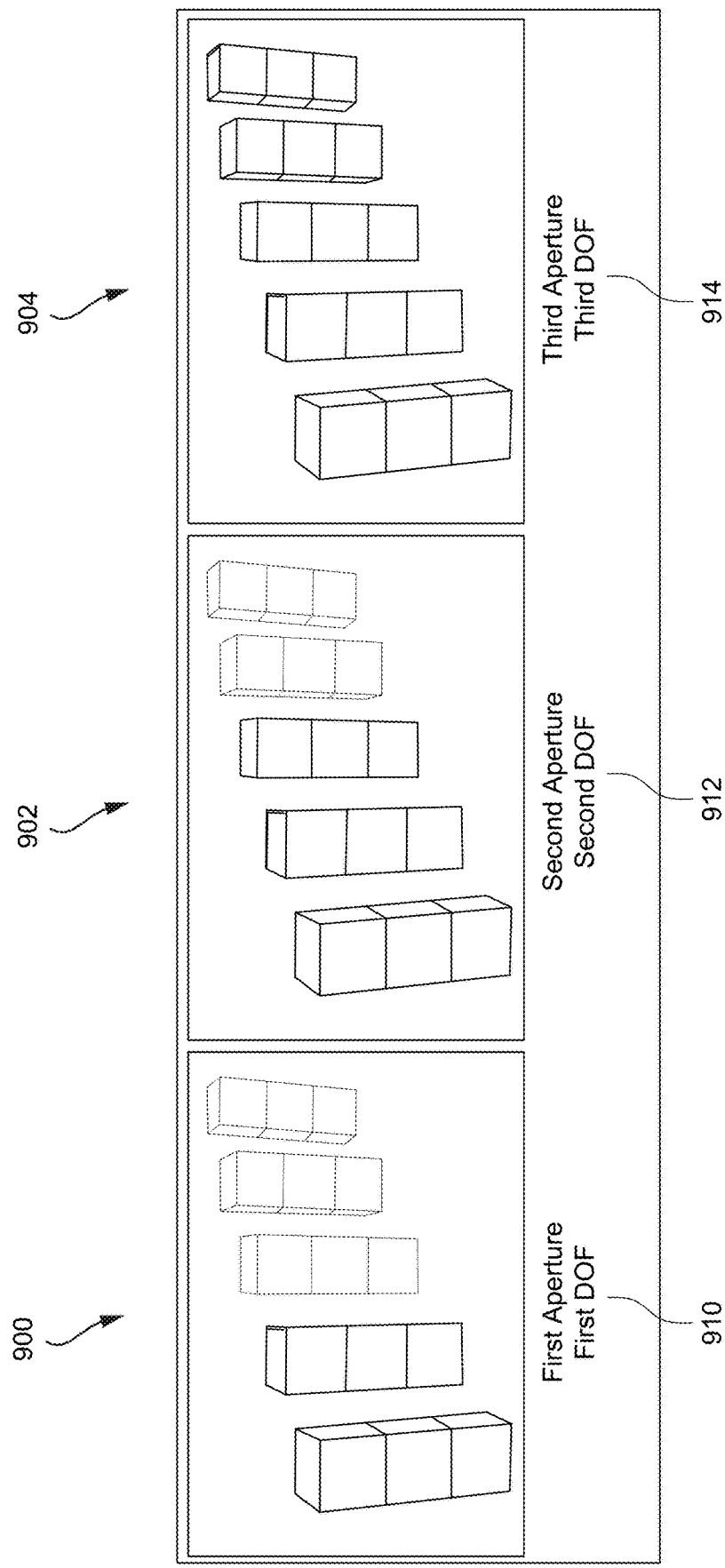
FIG. 9 is a diagram illustrating example images captured using different apertures, in accordance with some examples of the present disclosure.

In some cases, the camera system can adjust a lens aperture to aid in the object detection described herein. For example, certain camera modules can have an adjustable aperture. In such cases, the camera system can adjust the aperture to achieve a different depth-of-field, which can aid in detecting objects. To illustrate, FIG. 9 illustrates images 900, 902, and 904 captured using different apertures. Here, image 900 was captured using a first aperture 910, image 902 was captured using a second aperture 912 that is smaller than the first aperture 910, and image 904 was captured using a third aperture 914 that is smaller than the second aperture 912.

As shown, the different apertures 910, 912, and 914 result in different depth-of-fields in the images 900, 902, and 904, with the smallest aperture (e.g., third aperture 914) resulting in the deepest depth-of-field and the largest aperture (e.g., first aperture 910) resulting in the shallowest depth-of-field.

The camera system can thus use different apertures (e.g., first aperture 910, second aperture 912, and third aperture 914) to leverage different associated depth-of-fields to aid in object detection. For example, the camera system can use a smaller aperture (e.g., third aperture 914 or second aperture 912) in order to achieve a deeper depth-of-field. The deeper depth-of-field can allow the camera system to reduce the number of focal distances to check (or only check one focal distance) for objects of interest.

In some cases, the aperture selected can depend on the light level in the scene/environment. For example, in low-light scenarios a larger aperture (e.g., first aperture 910) even though such larger aperture can result in a shallower depth-of-field and potentially require more focal distance stops/checks.

In some cases, instead of or in addition to serially selecting a specific focal distance to use/test, an object detection process implemented by a camera system with multiple image sensors can serially select a specific image sensor with a lowest power profile at a given focal distance. Electronic devices often have multiple cameras, and each of the cameras may have its own specific characteristics such as, for example, FOV, focus power profile, aperture, etc. Thus, an object detection process can use multiple cameras. For example, the object detection process can select a specific camera for a given focal distance, as one image sensor may have a lower focus power for a specific focal distance while another image sensor may have a lower focus power for a different focal distance. In some examples, the focus/lens controller 406 can select, from a set of cameras, the lowest-power camera (e.g., with appropriate settings) for a focal distance or the camera with the best risk/reward value for a focal distance.

Figure 10:
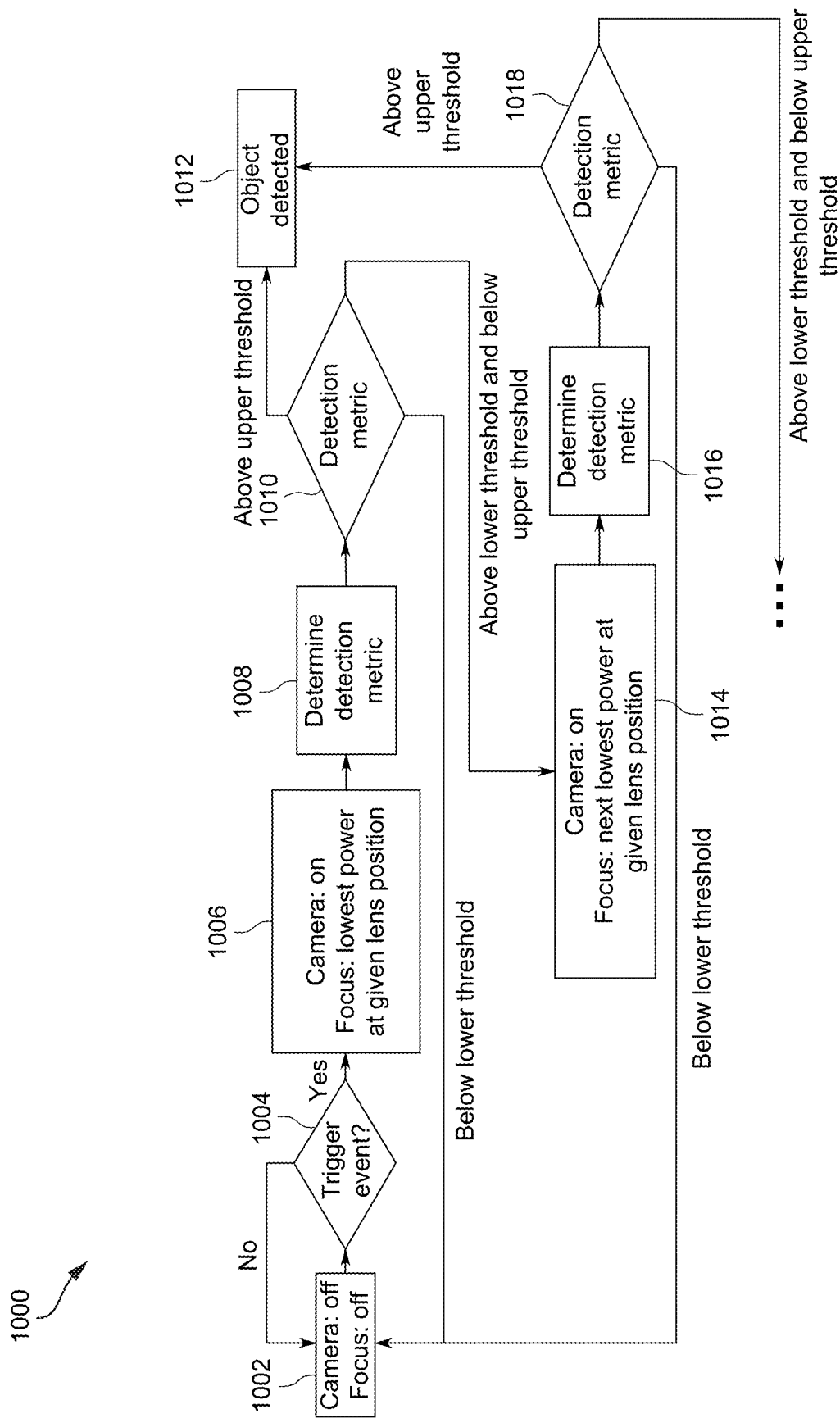
FIG. 10 is a flowchart illustrating an example process for object detection using multiple image sensors, in accordance with some examples of the present disclosure.

FIG. 10 is a flowchart illustrating an example process 1000 for object detection using multiple cameras. In this example, at block 1002, the process 1000 can start with the camera system (e.g., front-facing camera 104, camera 420) in an off state (e.g., focus off, power off). At block 1004, the process 1000 can determine whether a trigger event has occurred.

If a trigger event is not detected, the process 1000 can return to block 1002 and maintain the camera system in the off state. If a trigger event is detected, at block 1006, the process 1000 can turn the camera system on and select a lowest-power camera for a given focal distance.

At block 1008, the process 1000 can determine an object detection confidence based on an image captured by the camera system using the selected lowest-power camera.

At block 1010, the process 1000 can determine whether the detection metric (e.g., confidence value) is above or below one or more confidence thresholds. In some examples, the one or more confidence thresholds can include an upper threshold that corresponds to a threshold certainty/likelihood that the object of interest is present in the image, and a lower threshold that corresponds to a threshold certainty/likelihood that the object of interest is not present in the image.

If the detection metric is above or at the upper threshold, at block 1012, the process 1000 can determine that the object of interest has been detected. If the detection confidence is below or at a lower threshold, the process 1000 can return to block 1002. For example, the process 1000 can power off the camera system if the detection confidence indicates that the object of interest is not present in the image. If the detection confidence is above the lower threshold but below the upper threshold, at block 1014, the process 1000 can select a next lowest-power camera for the given focal distance.

At block 1016, the process 1000 can determine an additional detection confidence based on another image captured by the camera system using the next lowest-power camera. The object detection confidence can include a value indicating a confidence that the object of interest is or is not present in the image.

At block 1018, the process 1000 can determine whether the additional detection metric is above or below one or more confidence thresholds. In some examples, if the additional detection metric is above or at the upper threshold, at block 1012, the process 1000 can determine that the object of interest has been detected. If the additional detection metric is below or at a lower threshold, the process 1000 can return to block 1002 and power off the camera system.

If the additional detection metric is above the lower threshold but below the upper threshold, the process 1000 can again select a following lowest-power camera for the focal distance (e.g., if another camera is available). The process 1000 can serially perform the detection confidence checks described above for different cameras having different power profiles for a given focal distance. The process 1000 can select the specific camera at each iteration based on an order from lower power profile to higher power profile. In other examples, the process 1000 can select the specific camera at each iteration based on an order that is based on risk/reward values calculated for the different cameras, with cameras having a better risk/reward being checked before other cameras having a worse risk/reward.

FIG. 11 is a flowchart illustrating an example process 1100 for low power, variable focus object detection. At block 1102, the process 1100 can include obtaining, based on a trigger event, a first image of a scene captured by an image capturing device (e.g., front-facing camera 104, camera 420) with a lens that is in a first configuration of a plurality of available lens configurations.

In some examples, the trigger event can include inertial motion above a threshold, an audio change above a threshold, a change in ambient light above a threshold, a change in a range to the object above a threshold, a trigger from an application associated with the method, a depth measurement from an active depth sensing system, a trigger from a global navigation satellite system, a trigger from a global positioning system, a data connection, and a phase detection change above a threshold, and/or a phase detection change above a threshold. In some cases, the trigger event can be detected based on data (e.g., sensor data 430, image data 432) from one or more sensors. In some examples, the one or more sensors can include an image sensor (e.g., camera 420), an audio sensor, a gyroscope, an accelerometer, an inertial measurement unit, an ambient light sensor, and/or a depth sensor.

At block 1104, the process 1100 can include determining, based on the first image of the scene and a first detection result, whether an object of interest is present in the first image. In some examples, the object of interest can include a document, a quick response (QR) code, a face, a finger, a hand, a device, a product, and/or an animal.

At block 1106, the process 1100 can include adjusting, in response to determining that the object of interest is not present in the first image, the lens to a second configuration selected from the plurality of available lens configurations. In some cases, the determination that the object of interest is not present in the first image can be based on a confidence value (e.g., an object detection metric) in the first detection result being below a threshold. In some examples, the threshold can include an upper confidence threshold. In some cases, the confidence value (e.g., object detection metric) used to determine that the object of interest is not present in the first image can be below (or at) the upper confidence threshold and above (or at) a lower confidence threshold.

In some examples, the second lens configuration can be selected from the plurality of available lens configurations based on an amount of power required by the image capturing device to adjust the lens to the second lens configuration. In some cases, the amount of power can be relative to one or more different amounts of power required by the image capturing device to adjust the lens to one or more other lens configurations from the plurality of available lens configurations.

In some examples, the first configuration can include a first lens position and the second configuration can include a second lens position that is different than the first lens position. In some cases, adjusting the lens can include moving the lens from the first lens position to the second lens position using a focus motor. The focus motor can include, for example and without limitation, a voice-coil motor (VCM), piezoelectric motor, stepper motor, ultrasonic motor, electroactive polymer motor, electromagnetic focus motor, geared direct current (DC) motor, direct drive super sonic wave motor, solid state lens controller, among others.

In some examples, the plurality of available lens configurations can include a plurality of available lens positions, and the second lens location can be selected from the plurality of available lens positions based on an amount of power required by the focus motor to move the lens from the first lens position to the second lens position relative to one or more different amounts of power required by the focus motor to move the lens to one or more other positions from the plurality of available lens positions. In some cases, the amount of power required by the focus motor to move the lens from the first lens position to the second lens position can include a next lowest amount of power relative to the amount of power associated with the first lens position and/or the one or more amounts of power required by the focus motor to move the lens to the one or more other positions from the plurality of available lens positions.

In some examples, the second lens location can be selected from the plurality of available lens positions based on priorities of focal distances associated with the plurality of available lens positions. In some examples, the priorities of the focal distances associated with the plurality of available lens positions can be based on respective likelihoods of detecting the object of interest in images captured from each of the plurality of available lens positions and an amount of power required by the focus motor to move the lens to each of the plurality of available lens positions. In some examples, the priorities of the focal distances associated with the plurality of available lens positions can be based on a default type of the object of interest or a type of the object detected.

In some cases, the second lens location can be selected from the plurality of available lens positions based on a relative distance between the first position and each of the plurality of available lens positions. In some examples, the second position is selected from the plurality of available lens positions based on a shortest relative distance between the first position and each of the plurality of available lens positions.

In some cases, the second position can be selected from the plurality of available lens positions based on one or more characteristics of the lens. In some examples, the one or more characteristics of the lens can include a current aperture associated with the lens, a field-of-view associated with the lens, and/or a focus power profile associated with the lens.

At block 1108, the process 1100 can include obtaining, by the image capturing device, a second image of the scene while the lens is in the second configuration. The first configuration and the second configuration can include, for example and without limitation, different lens positions, different apertures, different depth-of-fields, different power profiles, different focal distances, etc.

At block 1110, the process 1100 can include determining, based on the second image of the scene and a second detection result, that the object of interest is present in the second image. In some cases, the first detection result and the second detection result can include confidence values (e.g., object detection metrics). In some examples, the process 1100 can determine that a confidence value in the second detection result is above (or at) a threshold (or an upper threshold), and determine that the object has been detected (e.g., is present in the second image) based on the confidence value being above (or at) the threshold (or the upper threshold).

In some aspects, the process 1100 can include selecting the lens from a plurality of available lenses based on one or more characteristics of the lens and a focal distance associated with the object of interest. In some examples, the one or more characteristics can include an aperture, a field-of-view, and/or a focus power profile. In some cases, the lens can be selected from the plurality of available lenses based on a determination that the focus power profile associated with the lens includes a lower focus power than a respective focus power profile of one or more (or all) lenses from the plurality of available lenses.

In some cases, the second lens position can be selected from a plurality of available lens positions based on a confidence value (e.g., an object detection metric from the first detection result) associated with the first detection result.

In some aspects, selecting the second lens position can include reducing, based on a first confidence value associated with the first detection result, the number of the plurality of available lens positions excluding one or more positions as non-available lens positions for the selection of the second lens position from the plurality of available lens positions.

In some examples, selecting the second lens position can include comparing the amount of power required by the focus motor to move the lens from the first lens position to the second lens position, to one or more amounts of power the focus motor requires to move the lens from the first position to one or more other positions from the plurality of available lens positions.

In some cases, the second lens position is selected from a plurality of available lens positions based on a confidence value (e.g., an object detection metric) associated with a lens displacement from the first lens position to the second lens position.

In some aspects, the process 1100 can include, in response to determining that the object of interest is present in the second image, adjusting a different image capturing device associated with the apparatus. In some examples, adjusting the different image capturing device can include turning on the different image capturing device and/or initializing the different image capturing device. In some cases, the different image capturing device can include a main camera device and/or a higher-power camera device than the image capturing device. In some aspects, the process 1100 can include processing, via the different image capturing device, one or more images of the scene. In some cases, the one or more images can include the second image and/or a third image captured by the different image capturing device.

In some aspects, the process 100 can include, based on the second detection result, maintaining the lens in the second configuration.

In some cases, the first configuration can include a non-active optical image stabilization mode, and the second configuration can include an active optical image stabilization mode. In some examples, adjusting the lens to the second configuration can include activating the optical image stabilization mode using a lens stabilization motor.

In some examples, the first configuration can include a first aperture setting, and the second configuration can include a second aperture setting that is difference from the first aperture setting. In some cases, adjusting the lens to the second configuration can include changing the aperture of the lens from the first aperture setting to the second aperture setting using an aperture motor.

In some examples, the processes described herein (e.g., process 500, 700, 1000, 1100, and/or other process described herein) may be performed by a computing device or apparatus. In one example, the process 1100 can be performed by a computing device (e.g., mobile device 102 in FIG. 1) having a computing architecture of the computing system 1200 shown in FIG. 12. The computing device can also include the image processing system 400 shown in FIG. 4, which can implement various components as described above with respect to FIG. 4.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 700, 1000, and 1100 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The processes 500, 700, 1000, 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
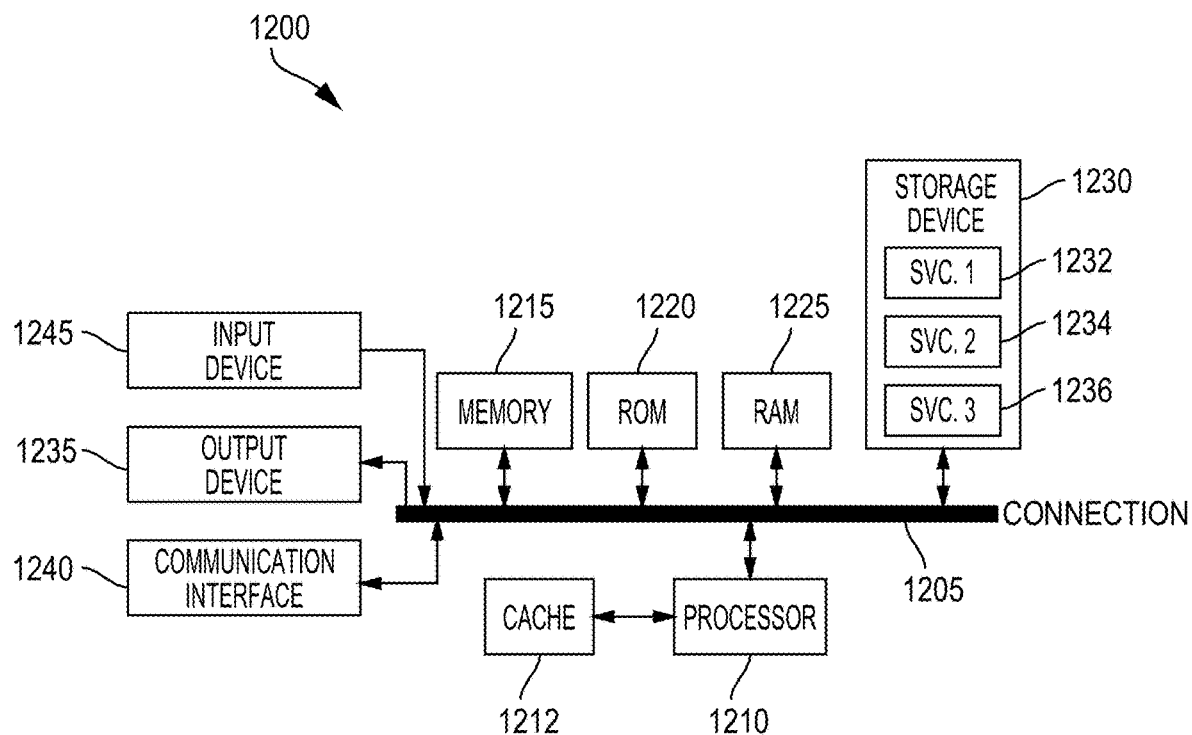
FIG. 12 illustrates an example computing device architecture, in accordance with some examples of the present disclosure.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. An apparatus comprising: memory configured to store data; and one or more processors coupled to the memory and configured to: obtain, based on a trigger event, a first image of a scene captured by an image capturing device, the first image being captured with a lens of the image capturing device that is in a first configuration of a plurality of available lens configurations; determine, based on the first image of the scene and a first detection result, whether an object of interest is present in the first image; in response to determining that the object of interest is not present in the first image, adjust the lens to a second configuration selected from the plurality of available lens configurations; obtain, by the image capturing device, a second image of the scene while the lens is in the second configuration; and determine, based on the second image of the scene and a second detection result, that the object of interest is present in the second image.

Aspect 2. The apparatus of Aspect 1, wherein the first detection result and the second detection result are confidence values.

Aspect 3. The apparatus of any of Aspects 1 to 2, wherein the one or more processors are configured to select the second lens configuration from the plurality of available lens configurations based on an amount of power required by the image capturing device to adjust the lens to the second lens configuration relative to one or more different amounts of power required by the image capturing device to adjust the lens to one or more other lens configurations from the plurality of available lens configurations.

Aspect 4. The apparatus of any of Aspects 1 to 3, wherein the first configuration comprises a first lens position, wherein the second configuration comprises a second lens position that is different than the first lens position, and wherein, to adjust the lens to the second configuration, the one or more processors are configured to: move the lens from the first lens position to the second lens position using a focus motor.

Aspect 5. The apparatus of Aspect 4, wherein the plurality of available lens configurations comprises a plurality of available lens positions, and wherein the second lens position is selected from the plurality of available lens positions based on a confidence value associated with the first detection result.

Aspect 6. The apparatus of Aspect 5, wherein, to select the second lens position, the one or more processors are configured to: reduce, based on the first confidence value, the number of the plurality of available lens positions excluding one or more positions as non-available lens positions for the selection of the second lens position from the plurality of available lens positions.

Aspect 7. The apparatus of any of Aspects 4 to 6, wherein the plurality of available lens configurations comprises a plurality of available lens positions, and wherein the second lens position is selected from the plurality of available lens positions based on an amount of power the focus motor requires to move the lens from the first lens position to the second lens position.

Aspect 8. The apparatus of Aspect 7, wherein, to select the second lens position, the one or more processors are configured to: compare the amount of power to one or more amounts of power the focus motor requires to move the lens from the first position to one or more other positions from the plurality of available lens positions.

Aspect 9. The apparatus of any of Aspects 4 to 8, wherein the plurality of available lens configurations comprises a plurality of available lens positions, and wherein the second lens position is selected from the plurality of available lens positions based on a confidence value associated with a lens displacement from the first lens position to the second lens position.

Aspect 10. The apparatus of any of Aspects 4 to 9, wherein the plurality of available lens configurations comprises a plurality of available lens positions, and wherein the second lens position is selected from the plurality of available lens positions based on priorities of focal distances associated with the plurality of available lens positions.

Aspect 11. The apparatus of Aspect 10, wherein the priorities of the focal distances associated with the plurality of available lens positions are based on a default type of the object of interest or a type of the object detected in the first image.

Aspect 12. The apparatus of any of Aspects 4 to 11, wherein the plurality of available lens configurations comprises a plurality of available lens positions, and wherein the second lens position is selected from the plurality of available lens positions based on a relative distance between the first position and each of the plurality of available lens positions.

Aspect 13. The apparatus of any of Aspects 4 to 12, wherein the plurality of available lens configurations comprises a plurality of available lens positions, and wherein the second position is selected from the plurality of available lens positions based on one or more characteristics of the lens, the one or more characteristics of the lens comprising at least one of an aperture associated with the lens, a field-of-view associated with the lens, and a focus power profile associated with the lens.

Aspect 14. The apparatus of any of Aspects 4 to 13, wherein the one or more processors are configured to select the lens from a plurality of available lenses based on one or more characteristics of the lens and a focal distance associated with the object of interest.

Aspect 15. The apparatus of Aspect 14, wherein the one or more characteristics comprise at least one of an aperture, a field-of-view, and a focus power profile.

Aspect 16. The apparatus of Aspect 14, wherein the lens is selected from the plurality of available lenses based on a determination that a focus power profile associated with the lens comprises a lower focus power than a respective focus power profile of one or more lenses from the plurality of available lenses.

Aspect 17. The apparatus of any of Aspects 1 to 16, wherein the object of interest comprises at least one of a document, a quick response code, a face, a finger, a hand, a device, a product, and an animal.

Aspect 18. The apparatus of any of Aspects 1 to 17, wherein the trigger event comprises inertial motion above a threshold, an audio change above a threshold, a change in ambient light above a threshold, a change in a range to the object above a threshold, a trigger from an application associated with the apparatus, a depth measurement from an active depth sensing system, a trigger from a global navigation satellite system, a trigger from a global positioning system, a data connection, and a phase detection change above a threshold.

Aspect 19. The apparatus of any of Aspects 1 to 18, wherein the one or more processors are configured to: in response to determining that the object of interest is present in the second image, adjust a different image capturing device associated with the apparatus, wherein adjusting the different image capturing device comprises at least one of turning on the different image capturing device and initializing the different image capturing device, wherein the different image capturing device comprises at least one of a main camera device and a higher-power camera device than the image capturing device.

Aspect 20. The apparatus of Aspect 19, wherein the one or more processors are configured to: process, via the different image capturing device, one or more images of the scene, the one or more images comprising at least one of the second image and a third image captured by the different image capturing device.

Aspect 21. The apparatus of any of Aspects 1 to 20, wherein the one or more processors are configured to: based on the second detection result, maintain the lens in the second configuration.

Aspect 22. The apparatus of any of Aspects 1 to 21, wherein the first configuration comprises a non-active optical image stabilization mode, and the second configuration comprises an active optical image stabilization mode, and wherein, to adjust the lens to the second configuration, the one or more processors are configured to: activate the optical image stabilization mode using a lens stabilization motor.

Aspect 23. The apparatus of any of Aspects 1 to 22, wherein the first configuration comprises a first aperture setting, and wherein the second configuration comprises a second aperture setting that is difference from the first aperture setting, and wherein, to adjust the lens to the second configuration, the one or more processors are configured to: change the aperture of the lens from the first aperture setting to the second aperture setting using an aperture motor.

Aspect 24. The apparatus of any of Aspects 1 to 23, wherein the apparatus comprises a mobile device.

Aspect 25. The apparatus of any of Aspects 1 to 24, wherein the apparatus comprises the image capturing device, and wherein the image capturing device comprises a camera.

Aspect 26. The apparatus of any of Aspects 1 to 25, wherein a condition for successful detection includes a predefined threshold or a user-configured threshold.

Aspect 27. The apparatus of any of Aspects 1 to 26, wherein at least one of the first detection result and the second detection result includes at least one of a probability score or metric, a probabilistic prediction, a classification, a label, a cost or loss function value, an estimate, a ranking, and a binary prediction.

Aspect 28. The apparatus of any of Aspects 1 to 27, wherein the first configuration comprises a first lens position, wherein the second configuration comprises a second lens position that is different than the first lens position, wherein the plurality of available lens configurations comprises a plurality of available lens positions, and wherein the second lens position is selected from the plurality of available lens positions based on a relative distance between the first position and each of the plurality of available lens positions, and wherein the second position is selected from the plurality of available lens positions based on a shortest relative distanced between the first lens position and each of the plurality of available lens positions.

Aspect 29. A method comprising: obtaining, based on a trigger event, a first image of a scene captured by an image capturing device, the first image being captured with a lens of the image capturing device that is in a first configuration of a plurality of available lens configurations; determining, based on the first image of the scene and a first detection result, whether an object of interest is present in the first image; in response to determining that the object of interest is not present in the first image, adjust the lens to a second configuration selected from the plurality of available lens configurations; obtaining, by the image capturing device, a second image of the scene while the lens is in the second configuration; and determining, based on the second image of the scene and a second detection result, that the object of interest is present in the second image.

Aspect 30. The method of Aspect 29, wherein the first detection result and the second detection result are confidence values.

Aspect 31. The method of any of Aspects 29 to 30, further comprising selecting the second lens configuration from the plurality of available lens configurations based on an amount of power required by the image capturing device to adjust the lens to the second lens configuration relative to one or more different amounts of power required by the image capturing device to adjust the lens to one or more other lens configurations from the plurality of available lens configurations.

Aspect 32. The method of any of Aspects 29 to 31, wherein the first configuration comprises a first lens position, wherein the second configuration comprises a second lens position that is different than the first lens position, and wherein adjusting the lens to the second configuration further comprises: moving the lens from the first lens position to the second lens position using a focus motor.

Aspect 33. The method of Aspect 32, wherein the plurality of available lens configurations comprises a plurality of available lens positions, and wherein the second lens position is selected from the plurality of available lens positions based on a confidence value associated with the first detection result.

Aspect 34. The method of Aspect 33, wherein selecting the second lens position further comprises: reducing, based on the first confidence value, the number of the plurality of available lens positions excluding one or more positions as non-available lens positions for the selection of the second lens position from the plurality of available lens positions.

Aspect 35. The method of any of Aspects 32 to 34, wherein the plurality of available lens configurations comprises a plurality of available lens positions, and wherein the second lens position is selected from the plurality of available lens positions based on an amount of power the focus motor requires to move the lens from the first lens position to the second lens position.

Aspect 36. The method of Aspect 35, wherein selecting the second lens position further comprises: comparing the amount of power to one or more amounts of power the focus motor requires to move the lens from the first position to one or more other positions from the plurality of available lens positions.

Aspect 37. The method of any of Aspects 32 to 36, wherein the plurality of available lens configurations comprises a plurality of available lens positions, and wherein the second lens position is selected from the plurality of available lens positions based on a confidence value associated with a lens displacement from the first lens position to the second lens position.

Aspect 38. The method of any of Aspects 32 to 37, wherein the plurality of available lens configurations comprises a plurality of available lens positions, and wherein the second lens position is selected from the plurality of available lens positions based on priorities of focal distances associated with the plurality of available lens positions.

Aspect 39. The method of Aspect 38, wherein the priorities of the focal distances associated with the plurality of available lens positions are based on a default type of the object of interest or a type of the object detected in the first image.

Aspect 40. The method of any of Aspects 32 to 39, wherein the plurality of available lens configurations comprises a plurality of available lens positions, and wherein the second lens position is selected from the plurality of available lens positions based on a relative distance between the first position and each of the plurality of available lens positions.

Aspect 41. The method of any of Aspects 32 to 40, wherein the plurality of available lens configurations comprises a plurality of available lens positions, and wherein the second position is selected from the plurality of available lens positions based on one or more characteristics of the lens, the one or more characteristics of the lens comprising at least one of an aperture associated with the lens, a field-of-view associated with the lens, and a focus power profile associated with the lens.

Aspect 42. The method of any of Aspects 29 to 41, further comprising selecting the lens from a plurality of available lenses based on one or more characteristics of the lens and a focal distance associated with the object of interest, wherein the one or more characteristics comprise at least one of an aperture, a field-of-view, and a focus power profile.

Aspect 43. The method of Aspect 42, wherein the lens is selected from the plurality of available lenses based on a determination that a focus power profile associated with the lens comprises a lower focus power than a respective focus power profile of one or more lenses from the plurality of available lenses.

Aspect 44. The method of any of Aspects 29 to 43, wherein the trigger event comprises inertial motion above a threshold, an audio change above a threshold, a change in ambient light above a threshold, a change in a range to the object above a threshold, a trigger from an application associated with the method, a depth measurement from an active depth sensing system, a trigger from a global navigation satellite system, a trigger from a global positioning system, a data connection, and a phase detection change above a threshold.

Aspect 45. The method of any of Aspects 29 to 44, further comprising: in response to determining that the object of interest is present in the second image, adjusting a different image capturing device associated with the method, wherein adjusting the different image capturing device comprises at least one of turning on the different image capturing device and initializing the different image capturing device, wherein the different image capturing device comprises at least one of a main camera device and a higher-power camera device than the image capturing device.

Aspect 46. The method of Aspect 45, further comprising: processing, via the different image capturing device, one or more images of the scene, the one or more images comprising at least one of the second image and a third image captured by the different image capturing device.

Aspect 47. The method of any of Aspects 29 to 46, wherein the first configuration comprises a non-active optical image stabilization mode, and the second configuration comprises an active optical image stabilization mode, and wherein adjusting the lens to the second configuration further comprises activating the optical image stabilization mode using a lens stabilization motor.

Aspect 48. The method of any of Aspects 29 to 47, wherein the first configuration comprises a first aperture setting, and wherein the second configuration comprises a second aperture setting that is difference from the first aperture setting, and wherein adjusting the lens to the second configuration further comprises changing the aperture of the lens from the first aperture setting to the second aperture setting using an aperture motor.

Aspect 49. The method of any of Aspects 29 to 48, wherein a condition for successful detection includes a predefined threshold or a user-configured threshold.

Aspect 50. The method of any of Aspects 29 to 49, wherein at least one of the first detection result and the second detection result includes at least one of a probability score or metric, a probabilistic prediction, a classification, a label, a cost or loss function value, an estimate, a ranking, and a binary prediction.

Aspect 51. The method of any of Aspects 29 to 50, wherein the first configuration comprises a first lens position, wherein the second configuration comprises a second lens position that is different than the first lens position, wherein the plurality of available lens configurations comprises a plurality of available lens positions, wherein the second lens position is selected from the plurality of available lens positions based on a relative distance between the first position and each of the plurality of available lens positions, and wherein the second position is selected from the plurality of available lens positions based on a shortest relative distanced between the first lens position and each of the plurality of available lens positions.

Aspect 52. A non-transitory computer-readable medium having stored thereon instructions which, when executed by one or more processors, cause the one or more processors to perform a method according to any of Aspects 29 to 51.

Aspect 53. An apparatus comprising means for performing a method according to any of Aspects 29 to 51.

Aspect 54. An apparatus comprising: memory and one or more processors coupled to the memory, the one or more processors being configured to use a first image captured at a first configuration to make a first determination regarding whether an object of interest has been detected or not; if the detection result of the first determination does not satisfy a configured criterion, use a second image captured at a second configuration to make a second determination regarding whether the object of interest has been detected or not.

Aspect 55. The apparatus of Aspect 54, wherein the first detection result and the second detection result are confidence values.

Aspect 56. The apparatus of any of Aspects 54 to 55, wherein a condition for successful detection includes a predefined threshold or a user-configured threshold.

Aspect 57. The apparatus of any of Aspects 54 to 56, wherein the detection result includes one of a probability score or metric, a probabilistic prediction, a classification and/or label, a cost or loss function value, an estimate, a ranking, and/or a binary prediction.

Aspect 58. The apparatus of any of Aspects 54 to 57, wherein the first configuration comprises a first lens position of a lens of a camera of the apparatus, and wherein the second configuration comprises a second lens position of the lens, the second lens position being different than the first lens position.

Aspect 59. The apparatus of Aspect 58, wherein the one or more processors are configured to: in response to the detection result of the first determination not satisfying the configured criterion, moving the lens from the first lens position to the second lens position.

Aspect 60. The apparatus of Aspect 59, wherein the second lens position is selected from a plurality of available lens positions based on an amount of power required by a focus motor to move the lens from the first lens position to the second lens position relative to an amount of power required by the focus motor to move the lens from the first lens position to each other lens position from the plurality of available lens positions.

Aspect 61. The apparatus of any of Aspects 54 to 60, wherein the configured criterion comprises an object detection metric at or above a threshold.

Aspect 62. A method comprising: using a first image captured at a first configuration to make a first determination regarding whether an object of interest has been detected or not; if the detection result of the first determination does not satisfy a configured criterion, using a second image captured at a second configuration to make a second determination regarding whether the object of interest has been detected or not.

Aspect 63. The method of Aspect 62, wherein the first detection result and the second detection result are confidence values.

Aspect 64. The method of any of Aspects 62 to 63, wherein a condition for successful detection includes a predefined threshold or a user-configured threshold.

Aspect 65. The method of any of Aspects 62 to 64, wherein the detection result includes one of a probability score or metric, a probabilistic prediction, a classification and/or label, a cost or loss function value, an estimate, a ranking, and/or a binary prediction.

Aspect 66. The method of any of Aspects 62 to 65, wherein the first configuration comprises a first lens position of a lens of a camera of the apparatus, and wherein the second configuration comprises a second lens position of the lens, the second lens position being different than the first lens position.

Aspect 67. The method of Aspect 66, wherein the one or more processors are configured to: in response to the detection result of the first determination not satisfying the configured criterion, moving the lens from the first lens position to the second lens position.

Aspect 68. The method of Aspect 67, wherein the second lens position is selected from a plurality of available lens positions based on an amount of power required by a focus motor to move the lens from the first lens position to the second lens position relative to an amount of power required by the focus motor to move the lens from the first lens position to each other lens position from the plurality of available lens positions.

Aspect 69. The method of any of Aspects 62 to 68, wherein the configured criterion comprises an object detection metric at or above a threshold.

What is claimed is:

1. An apparatus comprising:
at least one memory configured to store data; and
at least one processor coupled to the at least one memory and configured to:
   obtain, based on a trigger event, a first image of a scene captured by an image capturing device, the first image being captured with a lens of the image capturing device that is in a first lens configuration of a plurality of available lens configurations, the first lens configuration comprising a first optical image stabilization mode, wherein the first image includes an object of interest;
   determine, based on the first image of the scene and a first detection result, a first confidence value indicating a likelihood that the object of interest is present in the first image;
   in response to determining that the first confidence value is less than at least one confidence threshold, activate a lens motor to adjust the lens to a second lens configuration selected from the plurality of available lens configurations, the second lens configuration comprising a second optical image stabilization mode;
   obtain, by the image capturing device, a second image of the scene while the lens is in the second lens configuration, wherein the second image includes the object of interest;

determine, based on the second image of the scene and a second detection result, a second confidence value indicating a likelihood that the object of interest is present in the second image; and in response to determining that the second confidence value is greater than the at least one confidence threshold, process the second image.

2. The apparatus of claim 1, wherein the at least one processor is configured to select a third lens configuration for the lens based on an amount of power required by the image capturing device to adjust the lens to the third lens configuration relative to one or more different amounts of power required by the image capturing device to adjust the lens to one or more other lens configurations.

3. The apparatus of claim 1, wherein a third lens configuration of the lens comprises a first lens position, wherein a fourth lens configuration of the lens comprises a second lens position that is different than the first lens position, and wherein, to adjust the lens to the fourth lens configuration, the at least one processor is configured to:

move the lens from the first lens position to the second lens position using the lens motor.

4. The apparatus of claim 3, wherein, the at least one processor is configured to:

reduce, based on the first confidence value, a number of a plurality of available lens positions excluding one or more positions as non-available lens positions for selection of the second lens position from a plurality of available lens positions.

5. The apparatus of claim 3, wherein the second lens position is selected from a plurality of available lens positions based on an amount of power the lens motor requires to move the lens from the first lens position to the second lens position.

6. The apparatus of claim 5, wherein, to select the second lens position, the at least one processor is configured to:

compare the amount of power to one or more amounts of power the lens motor requires to move the lens from the first lens position to one or more other positions from the plurality of available lens positions.

7. The apparatus of claim 3, wherein the second lens position is selected from a plurality of available lens positions based on a confidence value associated with a lens displacement from the first lens position to the second lens position.

8. The apparatus of claim 3, wherein the second lens position is selected from a plurality of available lens positions based on priorities of focal distances associated with the plurality of available lens positions.

9. The apparatus of claim 8, wherein the priorities of the focal distances associated with the plurality of available lens positions are based on a default type of the object of interest or a type of the object detected in the first image.

10. The apparatus of claim 3, the second lens position is selected from a plurality of available lens positions based on a relative distance between the first lens position and each of the plurality of available lens positions.

11. The apparatus of claim 3, the second lens position is selected from a plurality of available lens positions based on one or more characteristics of the lens, the one or more characteristics of the lens comprising at least one of an aperture associated with the lens, a field-of-view associated with the lens, or a focus power profile associated with the lens.

12. The apparatus of claim 3, wherein the at least one processor is configured to select the lens from a plurality of available lenses for at least one of the third lens configuration or the fourth lens configuration based on one or more characteristics of the lens and a focal distance associated with the object of interest.

13. The apparatus of claim 12, wherein the one or more characteristics comprise at least one of an aperture, a field-of-view, and a focus power profile.

14. The apparatus of claim 12, wherein the lens is selected from the plurality of available lenses based on a determination that a focus power profile associated with the lens comprises a lower focus power than a respective focus power profile of one or more lenses from the plurality of available lenses.

15. The apparatus of claim 1, wherein the object of interest comprises at least one of a document, a quick response (QR) code, a face, a finger, a hand, a device, a product, and an animal.

16. The apparatus of claim 1, wherein the trigger event comprises at least one of inertial motion above a threshold, an audio change above a threshold, a change in ambient light above a threshold, a change in a range to the object above a threshold, a trigger from an application associated with the apparatus, a depth measurement from an active depth sensing system, a trigger from a global navigation satellite system, a trigger from a global positioning system, a data connection, or a phase detection change above a threshold.

17. The apparatus of claim 1, wherein the at least one processor is configured to:

in response to determining that an additional object of interest is present in a third image captured by the image capturing device, adjust a different image capturing device associated with the apparatus, wherein adjusting the different image capturing device comprises at least one of turning on the different image capturing device and initializing the different image capturing device, wherein the different image capturing device comprises at least one of a main camera device or a higher-power camera device than the image capturing device.

18. The apparatus of claim 17, wherein the at least one processor is configured to:

process, via the different image capturing device, one or more images of the scene, the one or more images comprising at least one of the third image or a fourth image captured by the different image capturing device.

19. The apparatus of claim 1, wherein the at least one processor is configured to:

based on the second detection result, maintain the lens in the second lens configuration.

20. The apparatus of claim 1, wherein:

the first lens configuration comprises a non-active optical image stabilization mode, and the second lens configuration comprises an active optical image stabilization mode; and to adjust the lens to the second lens configuration, the at least one processor is configured to: activate the active optical image stabilization mode using the lens motor.

21. The apparatus of claim 1, wherein a third lens configuration of the lens comprises a first aperture setting, and wherein a fourth lens configuration of the lens comprises a second aperture setting that is different from the first aperture setting, and wherein, to adjust the lens to the fourth lens configuration, the at least one processor is configured to: change an aperture of the lens from the first aperture setting to the second aperture setting using an aperture motor.

22. The apparatus of claim 1, wherein the apparatus comprises a mobile device.

23. The apparatus of claim 1, wherein the apparatus comprises the image capturing device, and wherein the image capturing device comprises a camera.

24. A method comprising:
obtaining, based on a trigger event, a first image of a scene captured by an image capturing device, the first image being captured with a lens of the image capturing device that is in a first lens configuration of a plurality of available lens configurations, the first lens configuration comprising a first optical image stabilization mode, wherein the first image includes an object of interest;
determining, based on the first image of the scene and a first detection result, a first confidence value indicating a likelihood that the object of interest is present in the first image;
in response to determining that the first confidence value is less than at least one confidence threshold, activating a lens motor to adjust the lens to a second lens configuration selected from the plurality of available lens configurations, the second lens configuration comprising a second optical image stabilization mode;
obtaining, by the image capturing device, a second image of the scene while the lens is in the second lens configuration, wherein the second image includes the object of interest;
determining, based on the second image of the scene and a second detection result, a second confidence value indicating a likelihood that the object of interest is present in the second image; and
in response to determining that the second confidence value is greater than the at least one confidence threshold, process the second image.

25. The method of claim 24, further comprising selecting a third lens configuration for the lens based on an amount of power required by the image capturing device to adjust the lens to the third lens configuration relative to one or more different amounts of power required by the image capturing device to adjust the lens to one or more other lens configurations.

26. The method of claim 24, wherein a third lens configuration of the lens comprises a first lens position, wherein a fourth lens configuration of the lens comprises a second lens position that is different than the first lens position, and wherein adjusting the lens to the fourth lens configuration comprises:
moving the lens from the first lens position to the second lens position using the lens motor.

27. The method of claim 26, further comprising:
reducing, based on the first confidence value, a number of a plurality of available lens positions excluding one or more positions as non-available lens positions for selection of the second lens position from a plurality of available lens positions.

28. The method of claim 26, wherein the second lens position is selected from a plurality of available lens positions based on an amount of power the lens motor requires to move the lens from the first lens position to the second lens position.

29. The method of claim 28, wherein selecting the second lens position further comprises:
comparing the amount of power to one or more amounts of power the lens motor requires to move the lens from the first lens position to one or more other positions from the plurality of available lens positions.

30. The method of claim 26, wherein the second lens position is selected from a plurality of available lens positions based on a confidence value associated with a lens displacement from the first lens position to the second lens position.

31. The method of claim 26, wherein the second lens position is selected from a plurality of available lens positions based on priorities of focal distances associated with the plurality of available lens positions.

32. The method of claim 31, wherein the priorities of the focal distances associated with the plurality of available lens positions are based on a default type of the object of interest or a type of the object detected in the first image.

33. The method of claim 26, wherein the second lens position is selected from a plurality of available lens positions based on a relative distance between the first lens position and each of the plurality of available lens positions.

34. The method of claim 26, wherein the second lens position is selected from a plurality of available lens positions based on one or more characteristics of the lens, the one or more characteristics of the lens comprising at least one of an aperture associated with the lens, a field-of-view associated with the lens, or a focus power profile associated with the lens.

35. The method of claim 26, further comprising selecting the lens from a plurality of available lenses for at least one of the third lens configuration or the fourth lens configuration based on one or more characteristics of the lens and a focal distance associated with the object of interest, wherein the one or more characteristics comprise at least one of an aperture, a field-of-view, and a focus power profile.

36. The method of claim 35, wherein the lens is selected from the plurality of available lenses based on a determination that a focus power profile associated with the lens comprises a lower focus power than a respective focus power profile of one or more lenses from the plurality of available lenses.

37. The method of claim 24, wherein the trigger event comprises at least one of inertial motion above a threshold, an audio change above a threshold, a change in ambient light above a threshold, a change in a range to the object above a threshold, a trigger from an application associated with the method, a depth measurement from an active depth sensing system, a trigger from a global navigation satellite system, a trigger from a global positioning system, a data connection, or a phase detection change above a threshold.

38. The method of claim 24, further comprising:
in response to determining that an additional object of interest is present in a third image captured by the image capturing device, adjusting a different image capturing device associated with the method, wherein adjusting the different image capturing device comprises at least one of turning on the different image capturing device and initializing the different image capturing device, wherein the different image capturing device comprises at least one of a main camera device or a higher-power camera device than the image capturing device.

39. The method of claim 38, further comprising:
processing, via the different image capturing device, one or more images of the scene, the one or more images comprising at least one of the third image or a fourth image captured by the different image capturing device.

40. The method of claim 24, wherein:
the first lens configuration comprises a non-active optical image stabilization mode, and the second lens configuration comprises an active optical image stabilization mode; and adjusting the lens to the second lens configuration further comprises activating the active optical image stabilization mode using the lens motor.

41. The method of claim 24, wherein a third lens configuration of the lens comprises a first aperture setting, and wherein a fourth lens configuration of the lens comprises a second aperture setting that is different from the first aperture setting, and wherein adjusting the lens to the fourth lens configuration comprises changing an aperture of the lens from the first aperture setting to the second aperture setting using an aperture motor.

42. A non-transitory computer-readable medium having stored thereon instructions which, when executed by at least one processor, cause the at least one processor to:
   obtain, based on a trigger event, a first image of a scene captured by an image capturing device, the first image being captured with a lens of the image capturing device that is in a first lens configuration of a plurality of available lens configurations, the first lens configuration comprising a first optical image stabilization mode, wherein the first image includes an object of interest;
   determine, based on the first image of the scene and a first detection result, a first confidence value indicating a likelihood that the object of interest is present in the first image;
   in response to determining that the first confidence value is less than at least one confidence threshold, activate a lens motor to adjust the lens to a second lens configuration selected from the plurality of available lens configurations, the second lens configuration comprising a second optical image stabilization mode;
   obtain, by the image capturing device, a second image of the scene while the lens is in the second lens configuration, wherein the second image includes the object of interest;
   determine, based on the second image of the scene and a second detection result, that a second confidence value indicating a likelihood that the object of interest is present in the second image; and
   in response to determining that the second confidence value is greater than the at least one confidence threshold, process the second image.

43. The apparatus of claim 1, wherein the at least one confidence threshold includes a first confidence threshold and a second confidence threshold, the second confidence threshold being greater than the first confidence threshold, and wherein the at least one processor is configured to:
   adjust the lens to a second lens configuration based on the first confidence value being greater than the first confidence threshold and less than the second confidence threshold.

44. The apparatus of claim 43, wherein the at least one processor is configured to:
   determine that the object of interest is present in the second image based on the second confidence value being greater than the second confidence threshold.

45. The apparatus of claim 1, wherein, to process the second image, the at least one processor is configured to determine that the object of interest is present in the second image.

46. The apparatus of claim 1, wherein, to process the second image, the at least one processor is configured to at least one of store the second image or capture the second image.

47. The method of claim 24, wherein the at least one confidence threshold includes a first confidence threshold and a second confidence threshold, the second confidence threshold being greater than the first confidence threshold, the method further comprising:
   adjusting the lens to a second lens configuration based on the first confidence value being greater than the first confidence threshold and less than the second confidence threshold.

48. The method of claim 47, further comprising:
   determining that the object of interest is present in the second image based on the second confidence value being greater than the second confidence threshold.

49. The method of claim 24, wherein processing the second image comprises determining that the object of interest is present in the second image.

50. The method of claim 24, wherein processing the second image comprises at least one of storing the second image or capturing the second image.

* * * * *